United States Patent [19]

Payne

[11] Patent Number: 4,493,981

[45] Date of Patent: Jan. 15, 1985

[54] BOIL DRY PROTECTION SYSTEM FOR COOKING APPLIANCE

[75] Inventor: Thomas R. Payne, Louisville, Ky.

[73] Assignee: General Electric Company, Louisville, Ky.

[21] Appl. No.: 586,351

[22] Filed: Mar. 5, 1984

[51] Int. Cl.³ .............................................. H05B 1/02
[52] U.S. Cl. ................................... 219/450; 219/452; 219/453; 219/489; 219/492; 219/494; 219/506; 219/518
[58] Field of Search ............... 219/432, 433, 434, 445, 219/446, 447, 448, 449, 450, 451, 452, 453, 456, 459, 478, 489, 490, 492, 494, 506, 518

[56] References Cited

U.S. PATENT DOCUMENTS

| | | | |
|---|---|---|---|
| 3,118,044 | 1/1964 | Holtkamp | 219/450 |
| 3,153,139 | 10/1964 | Sivacek | 219/450 |
| 3,384,735 | 5/1968 | Linger | 219/456 |
| 3,819,906 | 6/1974 | Gould, Jr. | 219/506 |
| 4,164,645 | 8/1979 | Dogliotti | 219/452 |
| 4,214,150 | 7/1980 | Cunningham | 219/452 |
| 4,241,289 | 12/1980 | Bowling | 219/450 |
| 4,334,145 | 6/1982 | Norris, Sr. | 219/453 |
| 4,351,996 | 9/1982 | Kondo | 219/518 X |
| 4,394,565 | 7/1983 | Dills | 219/452 |

OTHER PUBLICATIONS

Technical Paper—presented to ASME by A. Myklebust et al—Aug. 1982—"Microcomputer Control of a Residential Range Top for Energy Conservation".
Technical Paper—International Appliance Technical Conf.—May 1983—Terai et al., "Boiling Point Detector for Surface Cooking Unit"—pp. 421-440.

Primary Examiner—Volodymyr Y. Mayewsky
Attorney, Agent, or Firm—H. Neil Houser; Radford M. Reams

[57] ABSTRACT

A power control arrangement for a cooking appliance incorporating an automatic surface unit for automatically detecting the occurrence of a boil dry condition for a utensil placed on the surface unit when operating in the Boil mode. In accordance with one form of the invention a boil dry condition is indicated when the rate of increase of sensed utensil temperature exceeds a predetermined reference rate, or the sensed utensil temperature exceeds a predetermined threshold temperature.

9 Claims, 18 Drawing Figures

BOIL DRY PROTECTION SYSTEM FOR COOKING APPLIANCE

CROSS REFERENCE TO A RELATED INVENTION

This application relates to commonly-assigned co-pending application Ser. No. 586,052, "Automatic Surface Unit Control Arrangement," filed in the name of Thomas R. Payne and David A. Schneider, the specification of which is hereby incorporated by reference.

BACKGROUND OF THE INVENTION

This invention relates generally to an improved power control arrangement for a surface heating unit in a cooking appliance such as a domestic electric range, and more particularly to a control arrangement which includes a temperature sensor responsive to the temperature of a utensil resting on the surface heating unit.

In cooking appliances having an automatic surface unit, that is a surface unit which is energized as a function of the temperature of the utensil being heated, an automatic Boil Mode may be provided which is intended to be utilized to bring water loads to a boil and sustain the boil temperature. If the utensil is left unattended when the appliance is operating in the boil mode, the water may completely evaporate. This boil dry condition may result in scorched food or possibly damage the utensil. It is desirable therefore to provide a protective arrangement which would rapidly detect the occurrence of such a condition, and upon detection turn off the surface unit and generate a signal alerting the user to the occurrence.

It is therefore an object of the present invention to provide a detection arrangement for a cooking appliance automatic surface unit of the type which enables the user to select a Boil Operating Mode, which arrangement rapidly and reliably detects the occurrence of a Boil Dry condition, de-energizes the surface unit and alerts the user to the occurrence.

SUMMARY OF THE INVENTION

In accordance with the present invention, a boil dry detection arrangement is provided for a cooking appliance of the type having at least one surface heating unit constructed and arranged to support a cooking utensil thereon while heating the contents thereof, adapted for energization by an external power supply. User operable input selection reans enables the user to select one of a plurality of boiling modes for varying the boiling rate of the water being heated. Energization of the heating unit is controlled by electronic control means. A temperature sensing device monitors the temperature of the utensil supported on the surface unit. Indicator means responsive to the control means provides a user discernible signal alerting the user to the occurrence of a boil dry condition.

In accordance with one aspect of the invention, the control means further includes means responsive to the temperature sensing means for determining the rate of increase of the sensed utensil temperature and detecting a rate of increase greater than a predetermined reference rate which reference rate characterizes a Boil Dry condition. Upon detection of such a rate of increase the control means de-energizes the surface unit and triggers indicator means to generate a warning signal to alert the user to the occurrence of the boil dry condition.

In accordance with another aspect of the invention, the control means includes means responsive to the temperature sensing means for detecting a sensed utensil temperature greater than a predetermined maximum reference temperature, which reference corresponds to the selected Boil Mode. The maximum reference temperature is selected such that a sensed utensil temperature greater than the reference temperature signifies a Boil Dry condition. For quick response to the occurrence of such a condition a different maximum reference temperature is established for each boil mode. To avoid false detection of a Boil Dry condition following a change from a relatively higher mode to a relatively lower mode having a lower maximum reference temperature, means are provided to detect such a change. The control means is operative to inhibit response to the comparing means during a period of predetermined duration immediately following detection of the change in boil mode selection. The duration of the predetermined period is selected to allow the heating unit sufficient time to reach the steady state level for the new mode selection.

In accordance with yet another aspect of the present invention the Boil Dry detection arrangement incorporates both the above-described rate monitoring detection arrangement and the temperature monitoring detection arrangement such that the control means responds identically to the detection of a Boil Dry condition by either arrangement. This combines the relatively rapid response of the rate monitoring arrangement and the greater reliability of the temperature monitoring arrangement to provide a rapidly responding and highly reliable Boil Dry detection arrangement.

DETAILED DESCRIPTION OF THE ILLUSTRATIVE EMBODIMENT

A. Overview

Figure 1:
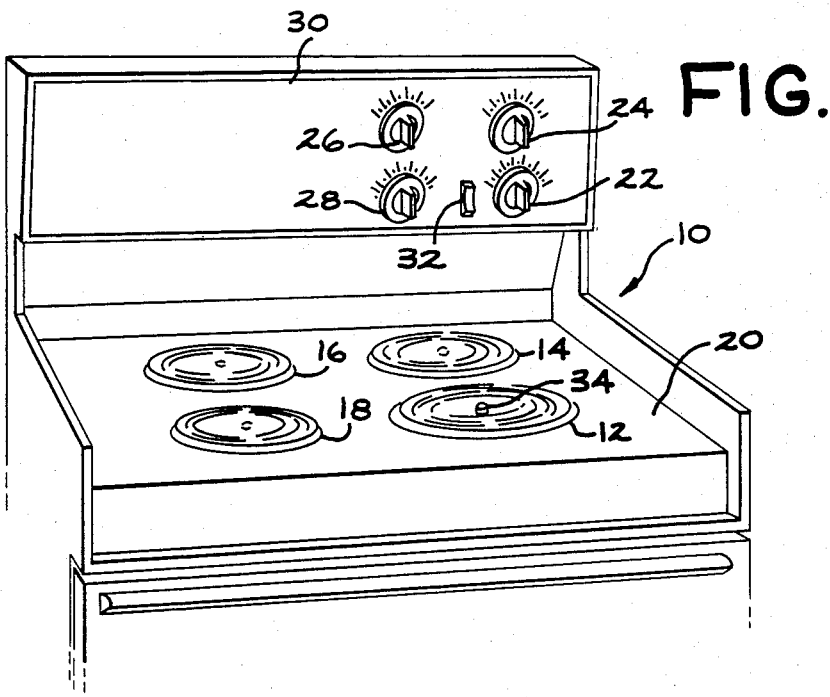
FIG. 1 is a front perspective view of a portion of an electric range illustratively embodying the power control arrangement of the present invention.

FIG. 1 illustrates an electric range 10 incorporating a control arrangement illustratively embodying the present invention. Range 10 includes four conventional electric surface unit resistive heating elements 12, 14, 16 and 18 supported in a substantially horizontal support surface 20. Each of elements 12–18 are adapted to support cooking utensils, such as frying pans, sauce pans, tea kettles, etc., placed thereon for heating. Manually operable rotary control knobs 22, 24, 26 and 28 are mounted to control panel 30. Control knobs 24, 26 and 28 enable the user to select the desired power level for heating elements 14, 16 and 18, respectively in a conventional manner. Heating element 12 is arranged to function as an automatic surface unit, that is, energization of element 12 is controlled as a function of the temperature of the utensil being heated thereon. It is common practice to provide only one automatic surface unit in multiple unit range or cooktop. However, multiple automatic surface units could be provided.

Figure 2:
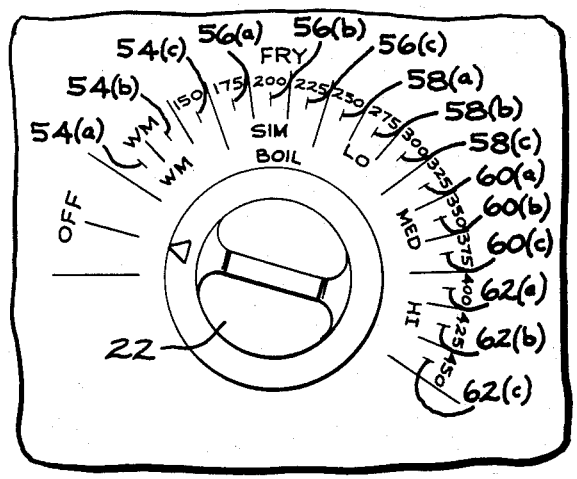
FIG. 2 is a greatly enlarged view of a portion of the control panel of the range of FIG. 1 showing the details of one of the control knobs thereof.

The sensed utensil temperature sensed by temperature sensing device 34 is used in implementing a plurality of operating modes for element 12 including a Fry Mode, and a general Boil mode. The general Boil mode comprises several actual Boil Modes, a Warm Mode and a Simmer Mode. Mode selection switch 32 on control panel 30 enables the user to select a Fry Mode or the general Boil Mode. As best seen in FIG. 2, control knob 22 enables the user to select a plurality of heat settings for the Fry Mode and to select for the general Boil Mode, Warm, Simmer and the actual Boil Modes Lo, Med and Hi, and to select from a plurality of heat settings within each of these modes as well.

Figure 3B:
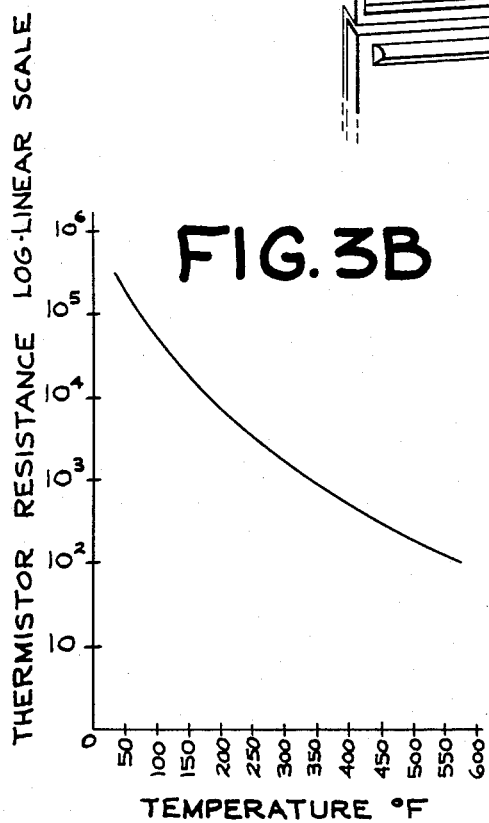
FIG. 3B is a graphic representation of the resistance versus temperature characteristic for the temperature sensor of FIG. 3A.
Figure 3A:
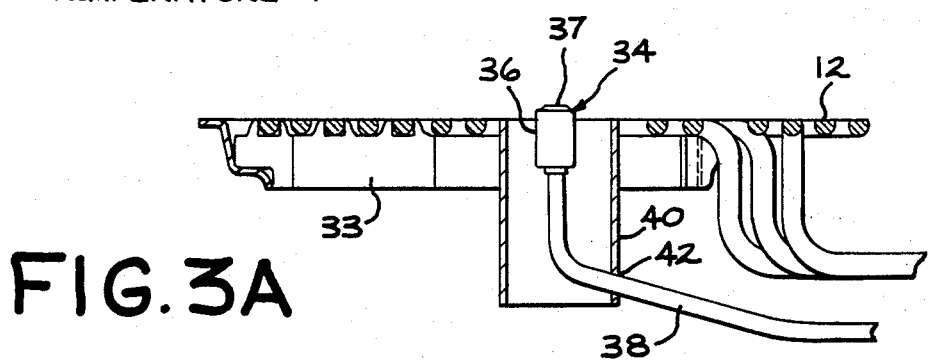
FIG. 3A is a sectional side view of a surface unit of the type incorporated in the range of FIG. 1 showing the temperature sensor.

The utensil temperature sensing arrangement employed in the illustrative embodiment will now be described with reference to FIG. 3A. Surface unit heating element 12 is supported on spider arms 33. The temperature sensor apparatus designated generally 34 includes a housing 36 mounted on one end of an elongated, generally L-shaped tubular arm 38.

A cylindrical shield 40 of low thermal mass metal forms the central core to which the radial spider arms 33 are attached and also serves to shield sensor housing 36 from radiated heat from heating element 12. Arm 38 extends through a slot 42 in shield 40, and bears against the upper end of the slot to hold housing 36 in the proper position slightly above the element 12 so as to cause the uppermost surface 37 of housing 36 to resiliently contact the bottom of a cooking utensil when it is placed on heating element 12. The temperature sensitive element (not shown) of the sensor contained within housing 36 is a conventional negative temperature coefficient thermistor having a resistance vs temperature characteristic as shown in FIG. 3B. The structural details of this sensor arrangement do not form any part of the subject invention and are thus described only to the extent necessary for an understanding of the present invention. Such devices are described in greater detail in commonly assigned U.S. Pat. No. 4,241,289, the disclosure of which is hereby incorporated by reference.

Figure 4:
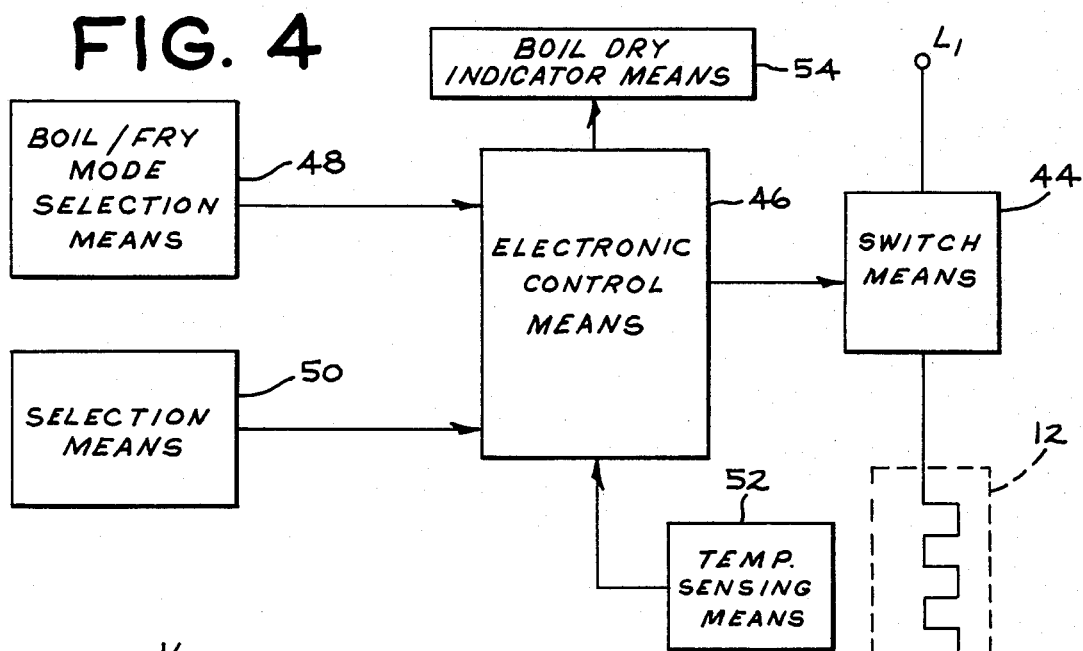
FIG. 4 is a greatly simplified functional block diagram of the control arrangement employed in the range of FIG. 1 incorporating the power control arrangement of the present invention.

A generalized functional block diagram of the power control arrangement for heating element 12 of range 10 is shown in FIG. 4 wherein heating element 12 is energized by a standard 60 Hz AC power signal which can be either 120 or 240 volts supplied to terminals L1 and L2. Power to element 12 is controlled by switch means 44 connected in series with element 12. Switch means 44 is switched into and out of conduction by control signals generated by electronic control means 46.

Electronic control means 46 generates power control signals in response to inputs from the user operable input selection means comprising Boil/Fry Mode selection means 48 and heat setting selection means 50, and inputs from temperature sensing means 52 which senses the temperature of the utensil being heated by element 12. The output of Boil/Fry Mode selection means 48 represents the state of mode selection switch 32 (FIG. 1) indicating to control means 46 whether the general Boil or Fry Mode has been selected. The output of heat setting selector means 50 represents the heat setting selected by the user by manipulation of control knob 22 (FIGS. 1,2). Boil Dry Indicator Means 54 generates a user discernible warning signal when triggered by control means 46 to alert the user of the occurrence of a "boil dry" condition.

In the illustrative embodiment, electronic control means 46 controls the power level applied to heating element 12 by controlling the duty cycle of heating element 12, i.e., the percentage of time power is applied to heating element 12. A predetermined control period comprising a fixed number of control intervals is employed as the time base for power control. The ratio of conductive control intervals to the total number of control intervals in the control period, expressed as a percentage, is hereinafter referred to as the duty cycle. Preferably each control interval comprises eight full cycles of the standard 60 Hz 240 volt AC power signal corresponding to a time period of approximately 133 milliseconds. Each control period comprises 32 control intervals corresponding to time period of approximately 4 seconds. The duration for the control interval and control period selected provide a satisfactory range of heat settings for desired cooking performance and can be programmed to make efficient use of microprocessor memory. It is understood however that control intervals and control periods of greater and lesser duration could be similarly employed. Electronic control means 46 selectively implements one of sixteen different duty cycle power levels, including a zero duty cycle or OFF level. Table I shows the percentage ON time, i.e. the duty cycle and the number of conductive control intervals per control period for each of sixteen available power levels.

In the description to follow, only the general Boil modes will be described. An applicable Fry mode is described in detail in the aforementioned co-pending Payne et al application.

TABLE I

| Power Level | % On Time | On Control Intervals Per Control Period | Hex Rep M(KB) |
|---|---|---|---|
| OFF | 0 | 0 | 0 |
| 1 | 3 | 1 | 1 |
| 2 | 6.5 | 2 | 2 |
| 3 | 9 | 3 | 3 |
| 4 | 12.5 | 4 | 4 |
| 5 | 16 | 5 | 5 |
| 6 | 22 | 7 | 6 |
| 7 | 25 | 8 | 7 |
| 8 | 31.5 | 10 | 8 |
| 9 | 37.5 | 12 | 9 |
| 10 | 44 | 14 | A |
| 11 | 50 | 16 | B |
| 12 | 62.5 | 20 | C |
| 13 | 75 | 24 | D |
| 14 | 87.5 | 28 | E |
| 15 | 100 | 32 | F |

A. (1) General Boil Mode

The General Boil Mode is selected via mode switch 32. Within this General Boil Mode, the user is further able to select the Warm, Simmer and actual Boil Mode, the latter being further divided into Lo, Med and Hi modes. The steady state temperature limits and the steady state power levels for the various heat settings are shown in Table II.

TABLE II

| | Boil Mode | | |
|---|---|---|---|
| Hexadecimal Representation of Input Setting(KB) | Selected Heat Setting | Steady State Utensil Temp. Range-°F. | Steady State Power Level |
| 0 | OFF | — | 0 |
| 1 | Wm(1) | 0–120 | 3 |
| 2 | Wm(2) | 121–146 | 3 |
| 3 | Wm(3) | 147–166 | 4 |
| 4 | Sim(1) | 198–219 | 4 |
| 5 | Sim(2) | 198–219 | 5 |
| 6 | Sim(3) | 198–219 | 6 |
| 7 | Lo(1) | 220–287 | 8 |
| 8 | Lo(2) | 220–287 | 9 |
| 9 | Lo(3) | 220–287 | A |
| A | Med(1) | 220–316 | B |
| B | Med(2) | 220–316 | B |
| C | Med(3) | 220–316 | C |
| D | Hi(1) | 220–360 | D |
| E | Hi(2) | 220–360 | E |
| F | Hi(3) | 220–360 | E |

A. (2) Warm Mode

The purpose of the Warm Mode is to enable the user to warm food quickly to a predetermined relative low temperature substantially less than the boiling point of water. This mode is particularly advantageous when warming milk, as the predetermined temperature is selected such that the milk may be warmed without risk of scalding, even if left unattended. As shown in Table II, the Warm Mode has associated with it three heat settings, designated Wm(1), Wm(2) and Wm(3) corresponding to selection marks 54(a), (b) and (c) for control knob 22. Heat setting Wm(1) has maximum temperature limit of 121° F. Heat settings Wm(2) and Wm(3) have associated therewith steady state temperature ranges 121°–146° F. and 147°–167° F., respectively. Selection of heat setting Wm(1) causes the heating element to be operated at power level 3 whenever the sensed utensil temperature is less than 121° F. For settings Wm(2) and Wm(3), heating element 12 is operated at power level 6 corresponding to a 22% duty cycle when the sensed utensil temperature is less than the minimum threshold temperature of 121° F. In order to bring the utensil temperature to its desired temperature, it has been empirically determined that for heating element 12 this is the maximum duty cycle which can be applied without risk of scorching food in the utensil. When the sensed utensil temperature is within the steady state range for settings Wm(2) and Wm(3), heating element 12 is operated at the steady state power levels 3 and 4, respectively. If the sensed utensil temperature rises above the upper threshold temperature for the selected setting, the heating element is de-energized until the sensed temperature cools to lower than the upper threshold temperature. Should the temperature fall below the desired range power level 6 is again implemented until the sensed temperature falls within the desired temperature range. The three heat settings in this mode enable the user to select the proper heat setting for the size of the food load being warmed.

A. (3) Simmer Mode

The Simrer Mode enables the user to heat food rapidly to a temperature closely approaching but not exceeding the boiling point of water (212° F.) and then to hold the temperature of the food at this level without boiling when left unattended.

There are three heat settings for the Simmer Mode designated in Table II as Sim(1), Sim(2) and Sim(3), which correspond to selection marks designated 56(a), (b) and (c) for control knob 22 (FIG. 2). The steady state temperature range for all three settings is 198°–220° F. This range for the sensed utensil temperature assures that the contents of the utensil will be near the boiling point of water (212° F.) but will not be hot enough to actually boil.

In order to rapidly bring the contents of the utensil to the desired simmer temperature for a variety of food load sizes and maintain that temperature efficiently, each of the three heat settings has a different steady state power level associated with it as shown in Table II. In order to rapidly reach the steady state temperature range with minimal overshoot, the electronic control means is operative in the Simmer Mode to operate the heating element at a predetermined relatively high power level when the sensed utensil temperature is less than a predetermined minimum simmer reference temperature. In the illustrative embodiment, the high power level is level 15 (100% duty cycle) and the threshold temperature is 121° F. For sensed utensil temperatures between the minimum reference temperature and a predetermined intermediate simmer reference temperature the heating element is operated at a predetermined intermediate power level. In the illustrative embodiment the intermediate reference temperature is 198° F. and the intermediate power level is power level 8 (31.5% duty cycle). For sensed utensil temperatures between the intermediate reference temperature and a predetermined maximum simmer reference temperature, the heating element is operated at the steady state power level associated with the selected heat setting. In the illustrative embodiment, the predetermined maximum simmer reference temperature is 220° F. The steady state power levels for Sim(1), Sim(2) and Sim(3) are 4, 5 and 6, respectively (12.5%, 16% and 22% duty cycle, respectively). The minimum, intermediate and maximum reference temperatures are selected to rapidly bring the temperature of the contents of the utensil to near its boiling point without boiling and to hold the controls near the boiling point without boiling.

After the sensed utensil temperature reaches the steady state temperature range, if the sensed temperature exceeds 220° F., the heating element is de-energized, i.e. power level 0 is applied. If the sensed utensil temperature drops below 198° F., power level 8 (37.5% duty cycle) is applied. When the sensed utensil temperature is within the 198°–220° F. range, the applied power level is that associated with the selected heat setting, i.e. level 4, 5 or 6 (Table II). This enables the user to select a duty cycle which will sufficiently heat the contents of the utensil to provide the desired simmer rate for the size of the load being heated while being assured that the sensed utensil temperature will remain within a relatively narrow temperature band set sufficiently low to prevent boiling.

A. (4) Actual Boil Mode

The operating mode broadly referred to as the general Boil Mode includes in addition to the hereinbefore described Warm and Simmer Modes, three Actual boil modes, that is three modes for controlling the actual boiling of water loads contained in utensils placed on heating element 12. These modes are designated Lo, Med, and Hi Modes. Each of these modes has three heat settings corresponding to selection marks designated 58($a$)–($c$), 60($a$)–($c$) and 62($a$)–($c$) for Lo, Med and Hi Boil Modes, respectively for control knob 22 (FIG. 2); hence, in the illustrative embodiment the user can select from a total of 9 heat settings for boiling water loads on heating element 12. The steady state power level for each heat setting is shown in Table II.

These nine heat settings enable the user to select the steady state power level or duty cycle which will provide the desired boiling rate from low to high for a particular size of utensil and volume of water being heated.

Rapid thermal response in the Boil Mode is achieved by operating the heating element at full power (power level 15, 100% duty cycle) when the sensed utensil temperature is less than a predetermined reference temperature. Because of the isothermal nature of the boiling water, thermal overshoot is of little concern. Hence, a relatively high minimum boil reference temperature may be selected which allows the water in the utensil to closely approach its boiling point (212° F.) even though the element is being overdriven at full power, thereby enhancing the speed of response. However, the temperature of the water and hence the sensed utensil temperature will not increase appreciably once the water load begins boiling. If boiling begins before the reference temperature is reached, the sensed reference temperature will likely not be exceeded, in which case maximum power would be applied to the heating element continuously, resulting in a highly energy inefficient operation. Therefore, it is critical that the minimum boil reference temperature be set sufficiently low to insure that it is sensed before boiling actually begins.

It has been empirically determined that a sensed utensil temperature of 220° F. brings the utensil contents sufficiently close to the boiling point to insure that the thermal inertia of the heating element will be sufficient to bring the contents of the utensil to its the boiling point and yet can be reliably sensed before the contents of the utensil begins to boil by the sensing arrangement of the illustrative embodiment. Hence, in the illustrative embodiment the minimum boil reference temperature is selected to be 220° F. When the sensed utensil temperature is less than 220° F., power level 15 is applied. When the sensed utensil temperature exceeds 220° F., the steady state power level associated with the selected heat setting is applied. This enables the user to vary the boiling rate and to achieve the desired boiling rate for various size water loads without employing a power level substantially higher than necessary thereby enhancing the energy efficiency of the appliance.

B. Boil Dry Detection Arrangement

As hereinbefore mentioned, when boiling water the temperature of the contents of the utensil will normally level off at around 212° F. and remain at that level regardless of the power level provided the power level is sufficient to sustain a boiling rate.

However, eventually the liquid will evaporate entirely resulting in a "boil dry" condition. If the boiling water is left unattended, the boil dry condition can result in scorched food or possibly damage to the utensil.

The present invention provides a control arrangement which automatically detects the occurrence of the "boil dry" condition; shuts off the surface unit; and provides a warning signal to alert the user to the condition.

The illustrative embodiment incorporates two means for detecting the Boil Dry condition. One monitors the rate of increase of the sensed utensil temperature to detect a rate of change of temperature greater than a predetermined threshold rate signifying the absence of liquid from the utensil, i.e. a boil dry condition. The other monitors the sensed utensil temperature to detect a temperature greater than a maximum reference temperature indicative of the boil dry condition.

Both means for detecting a boil dry condition rely upon the realization that when the utensil boils dry, the load is no longer isothermal. Consequently, for the same power level the energy which had heretofore been absorbed in the boiling process now results in raising the temperature of the remaining contents of the utensil and the utensil itself.

The means relying upon detection of a relatively high rate of change of utensil temperature provides a much quicker response in most instances than the direct temperature monitoring means. Hence, it is utilized as the primary boil dry detection means. However, it has been determined that under certain circumstances particularly those involving utensils or combination food and utensil loads, characterized by relatively high thermal mass, i.e. high specific heat constants, the thermal response is sufficiently slow that the rate of change may not increase sufficiently to be reliably detected using the rate of change monitoring approach. The temperature monitoring means is incorporated in the illustrative embodiment herein described as a secondary or back-up system. The temperature monitoring means responds less quickly than the rate monitoring means but it will reliably detect the Boil Dry condition even under these special conditions where the rate monitoring arrangement is less reliable. The use of both arrangements provides rapid detection of the boil dry condition under most circumstances, and is highly reliable under all circumstances.

It has been empirically determined that for the illustrative embodiment herein described, the boil dry condition for most typical utensils used for boiling and under the various Boil Mode duty cycles is characterized by a rate of increase in the sensed utensil temperature on the order of 2.5°-3° F./second or higher. Hence, in the illustrative embodiment, the primary Boil Dry detection means monitors the rate of change of the sensed utensil temperature to detect a rate of change greater than approximately 2.5°-3.0° F./second. Upon detection of such a rate of increase, the control means de-energizes the heating element and initiates a warning signal to alert the user.

The secondary or back-up detection arrangement employed in the illustrative embodiment utilizes a maximum reference temperature. As shown in Table II a different maximum temperature is associated with each of the low, medium and high boil modes. The maximum temperature shown in Table II for each mode is the Boil Dry reference temperature for that mode. These temperatures were empirically selected as representative of utensil temperatures which, given the steady state power levels for the various boil modes, would only be reached in the event no water remained in the utensil. Different reference values are provided for each of the Lo, Med and Hi Modes because even though the temperature of the boiling water does not significantly exceed 212° F. regardless of the heating element duty cycle, the utensil temperature in the vicinity of the sensor can increase significantly with increasing power level or duty cycle, to the extent that the reference temperature for the low mode might be exceeded by the sensed utensil temperature when the surface unit is operated at the higher boiling modes which call for the relatively high duty cycles. One approach is to only use the worst case maximum reference temperature. However, this approach results in significantly longer times elapsing before the boil dry condition is detected when operating in the lower modes, particularly when using utensils characterized by relatively high specific heats.

An arrangement which uses a different reference temperature for each mode is preferable as it enables the boil dry condition to be detected more rapidly for each mode.

The Lo boil rate mode has a lower maximum reference temperature which could be exceeded during normal boiling mode operations at the high mode. In order to prevent the detection system from responding to a false indication of a Boil Dry mode such as could occur when a mode selection is changed from the Hi Mode to the Lo Mode, means are provided for detecting the change in mode selection from the relatively higher modes to the relatively lower modes. The detection of a change in mode selection from higher to lower starts a timer which defines a transient period during which response to the detection of a boil dry condition indicated by a temperature greater than the reference temperature for the newly selected setting is inhibited. The duration of this time period is chosen to be sufficient to insure that for normal operation with water remaining in the utensil the utensil temperature has had sufficient time to fall to a level less than the maximum reference temperature for the newly selected mode. A time period on the order of two minutes has been empirically found to be sufficient for this purpose.

The tire period once initiated can be allowed to continue until it expires. However, it is possible for a boil dry condition to occur during this transient period in which case an additional delay in responding to the condition may result due to this transient time period. The likelihood of such a delay occurring is reduced in the illustrative embodiment by terminating the transient time period upon detection of a utensil temperature less than the maximum reference temperature for the newly selected mode. In such an arrangement the transient time period is initiated upon detection of a change in mode selection from a relatively higher mode to a relatively lower mode and is terminated upon the detection of a temperature less than the new reference or the expiration of the predetermined duration, whichever is the first to occur.

C. Microprocessor Implementation

C. (1) Control Circuit

Figure 5:
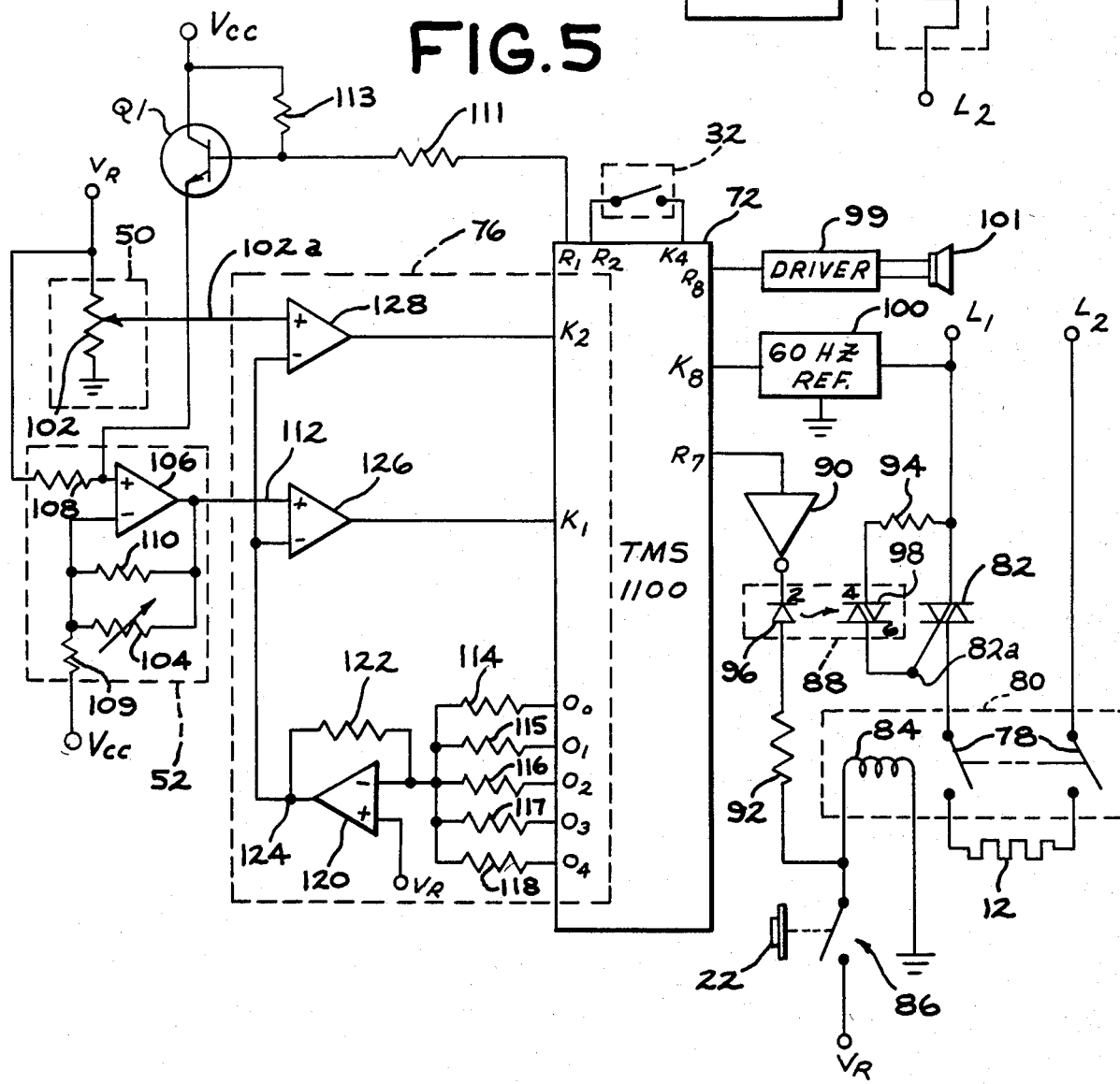
FIG. 5 is a simplified schematic diagram of a control circuit illustratively embodying the power control arrangement of the present invention as embodied in the range of FIG. 1.

A control circuit illustratively embodying a control arrangement implementing the hereinbefore described operating modes and the boil dry detection arrangement in accordance with the present invention is represented in simplified schematic form in FIG. 5. Electronic control means 46 of FIG. 4 is provided in the form of a microprocessor 72. Microprocessor 72 makes power control decisions for heating element 12 in response to input signals from input selection means comprising mode selection switch 32 and heat setting input means 50, and from temperature sensing means 52, in accordance with the control program stored in the Read Only Memory (ROM) of microprocessor to be hereinafter described.

Heating element 12 is connected across power lines L1 and L2 via normally open contacts 78 of ON/OFF relay 80 and power control triac 82. Power lines L1 and L2 are adapted for coupling to an external 60 Hz AC 120 or 240 volt typical domestic power supply. Coil 84 of ON/OFF relay 80 is serially connected between DC reference voltage supply $V_R$ and system ground via ON/OFF switch 86. Switch 86 is mechanically coupled in conventional manner (schematically illustrated in phantom) to control knob 22 (FIG. 2) such that switch 86 is in its open position when control knob 22 is in its OFF position. Movement of control knob 22 from its OFF position places switch 86 in its closed position energizing coil 84 which in turn closes contacts 78, thereby enabling power control triac 82 to control energization of element 12.

Microprocessor 72 controls the switching of power control triac 82 by trigger signals provided at output port R7. The signal at R7 is coupled to pin 2 of opto-isolator device 88 via inverting buffer amplifier 90. Pin 1 of opto-isolator 88 is coupled to dc reference voltage supply via current limiting resistor 92. The output return pin 4 of opto-isolator 88 is coupled to power line L2 via current limiting resistor 94. Pin 6 is coupled to the gate terminal 82a of power control triac 82 which is connected in series with heating element 12. A trigger signal at R7 is inverted by amplifier 90 forward biasing light emitting diode 96 of opto-isolator 88, which in turn switches the bipolar switch portion 98 of opto-isolator 88 into conduction, thereby applying a gate signal to power control triac 82 switching it into conduction.

Output port R8 of microprocessor 72 is coupled by conventional driver circuitry 99 to a conventional annunciator or tone generating device 101. Annunciator 101 provides an audible signal to the user when triggered by a trigger signal at port R8.

A 60 Hz pulse train is generated by conventional zero crossing detector circuit 100 coupled between L1 and input port K8 of microprocessor processor to facilitate synchronization of control system operation with zero crossings of the 60 Hz AC power signal applied across L1 and L2.

User inputs are provided to microprocessor 72 via Boil/Fry Mode selection switch means 32 and heat setting selection means 50 comprising input potentiometer 102. Mode selection switch 32 is directly coupled between output port R2 and input port K4 of microprocessor 72. The open and closed states of switch 32 signify selection of the general Boil Mode and Fry Mode, respectively. Microprocessor 72 determines the state of switch 32 by periodically generating a logical high signal at R2 and monitoring the input signal at K4.

Input potentiometer 102 is coupled between regulated 10 volt dc reference voltage supply VR and system ground. Wiper arm 102a of potentiometer 102 is positioned by user rotation of control knob 22 (FIG. 2). The voltage between wiper arm 102a and system ground is an analog signal representing the selected heat setting.

Temperature sensing means 52 comprises thermistor device 104 connected between the output and inverting input of operational amplifier 106. The non-inverting input of amplifier 106 is coupled to the dc reference voltage supply VR via resistor 108. The inverting input of amplifier 106 is coupled to regulated dc supply Vcc via resistor 109. A linearizing resistor 110 is connected in parallel with thermistor 104. The value of resistor 110 is selected such that the equivalent resistance of the parallel combination of resistor 110 and thermistor 104 varies approximately linearly with the temperature sensed by thermistor 104. By this arrangement the output voltage of amplifier 106 on line 112 is an approximately linear function of the temperature sensed by thermistor 104. The output voltage at line 112 has been found to represent the actual temperature of the outer surface of the utensil in contact with the sensor to an accuracy on the order of $\pm 2°-3°$ F.

In order to prolong the life of thermistor 104 a disabling circuit comprising transistor Q1 and biasing resistors 111 and 113 is connected between output port R1 of microprocessor 72 and the non-inverting input of amplifier 106. Output port R1 is coupled to the base of transistor Q1 via resistor 111. Resistor 113 is connected between the collector and base of resistor Q1. The collector is also tied to supply voltage Vcc. The emitter of transistor Q1 is connected to the non-inverting input of amplifier 106. The function of this arrangement is to only pass current through thermistor 104 when temperature measurements are being made. To this end microprocessor 72 sets output R1 causing a positive voltage to be applied to the base of transistor Q1 via resistor 111. This switches transistor Q1 into conduction pulling the voltage at the inverting input of amplifier 106 to Vcc. This similarly pulls the output voltage of amplifier 106 to Vcc. As a result there is no voltage drop across thermistor 104 and hence no current flow therthrough. When a temperature measurerent is to be made, R1 is reset, turning off transistor Q1, thereby effectively switching the disabling circuit out of the sensing circuit.

The analog heat setting and utensil temperature signals from potentiometer 102 and temperature sensing circuit 52, respectively, are converted to digital form for input to microprocessor 72 by A/D conversion circuitry 76. A/D circuit 76 utilizes a five-bit binary weighted ladder resistor network comprising resistors 114, 115, 116, 117 and 118, operational amplifier 120 and feedback resistor 122 coupled between output 124 of amplifier 120 and its inverting input. Resistors 114–118 couple output ports $O_0-O_4$, respectively, to the inverting input of amplifier 120. Analog voltage corresponding to coded outputs generated by microprocessor 72 at output ports $0_O-O_4$ are generated at output 124 of amplifier 120. This output voltage is coupled to the inverting inputs of operational amplifiers 126 and 128. The non-inverting inputs of amplifiers 126 and 128 are connected to the output line 112 of temperature circuit 52 and wiper arm 102a of potentiometer 102, respectively. The outputs of amplifiers 126 and 128 are coupled to input ports K1 and K2, respectively, of microprocessor 72.

Microprocessor 72 samples the temperature output signal by generating a sequence of five-bit signals at output ports $O_0-O_4$, each signal representing a threshold temperature. Each five-bit signal is converted to an analog voltage level at output 124 of amplifier 120. Microprocessor 72 internally monitors the state of input port K1. The heat setting input is similarly obtained by monitoring input port K2 as a sequence of digital signals appears at $O_0-O_4$, representing the 16 available heat settings. The codes utilized or temperature and heat setting determination will be described in detail hereinafter in conjunction with the description of the control program and more specifically the User Input Scan and the Temp Scan routines for the control program.

The following component values are believed suitable for use in the circuit of FIG. 5. These values are exemplary only, and are not intended to limit the scope of the claimed invention.

| Fixed Resistors (Ω) | | | | Transistor Q1 | |
|---|---|---|---|---|---|
| 92 | 220 | 114 | 162K | 2H2222 | |
| 94 | 220 | 115 | 82K | Opto-Isolator | |
| 108 | 47K | 116 | 40K | 88 MDC 3020 Integrated Circuit | |
| 109 | 925 | 117 | 20K | Operational Amplifiers | |
| 110 | 1.69K | 118 | 10K | 90 | ULN 2004A Integrated Circuit |
| 111 | 4.7K | 122 | 9.3K | 106 | |
| 113 | 10K | | | 120 | LM 308 Integrated Circuit |
| Variable Resistor (Ω) | | | | | |
| 102 | 50K | | | 126 | |
| Thermistor (Ω) | | | | 128 | |
| 104 | 100K | | | Microprocessor | |
| | | | | 72 Texas Instruments TMS 1100 | |
| | | | | Triac | |
| | | | | 82 General Electric SC 147 | |
| | | | | Surface Unit | |
| | | | | 12 General Electric WB 30 × 218 | |

C. (2) Control Program

Microprocessor 72 is customized to perform control functions in accordance with this invention by permanently configuring the Read Only Memory (ROM) of microprocessor 72 to implement predetermined control instructions. FIGS. 6 through 15 are flow diagrams which illustrate the control routines incorporated in the control program of microprocessor 72 to perform the control functions in accordance with the present invention. From these diagrams one of ordinary skill in the programming art can prepare a set of instructions for permanent storage in the ROM of microprocessor 72. For the sake of simplicity and brevity, the control routines to follow will be described with respect to the implementation of the control algorithms of the present invention. It should be understood that in addition to the control functions of the present control arrangement herein described there may be other control functions to be performed in conjunction with other operating characteristics of the appliance and in the control of the other three heating elements. Instructions for carrying out the routines described in the diagrams may be interleaved with instructions and routines for other control functions which are not part of the present invention.

The control program consists of a sequence of routines illustrated in the flow diagrams. The control program is cycled through once each control interval, i.e. once each 133 milliseconds. It should be noted that the control circuit is continually energized while the appliance is plugged in so that the control program for heating element 12 is cycled through every 133 milliseconds even if the OFF setting is selected. Hence, a power control decision for heating element 12 is made every 133 milliseconds.

The control program for controlling energization of heating element 12 is logically separated into several control routines. The Input Scan routine scans mode select switch 32 and conducts the A/D conversion of the analog voltage signal from input potentiometer 102 to determine the user selected mode and heat settings. The Temp Scan routine conducts the A/D conversion of the analog voltage signal representing the sensed utensil temperature. The Filter and Timing routine performs a software filter function resulting in an output signal which is the filtered utensil temperature signal. This routine also controls periodic sampling of the filtered signal to minimize radiation effects on its accuracy. This periodic sample is employed in the appropriate one of the Warm, Simmer, and Boil routines to determine the power level to be implemented as a function of the selected mode and heat setting and the sensed utensil temperature. The Temp Boil Dry and Delta Boil Dry routines detect the existence of a "Boil Dry" condition. The appropriate power level is input to the Power Compare Routine which makes the power control decision and the Power Out routine triggers power control triac 82 into conduction as appropriate thereby implementing the corresponding duty cycle for the desired power level. Each of the control program routines will be described in greater detail with reference to its flow diagram in the discussion to follow.

Figure 6:
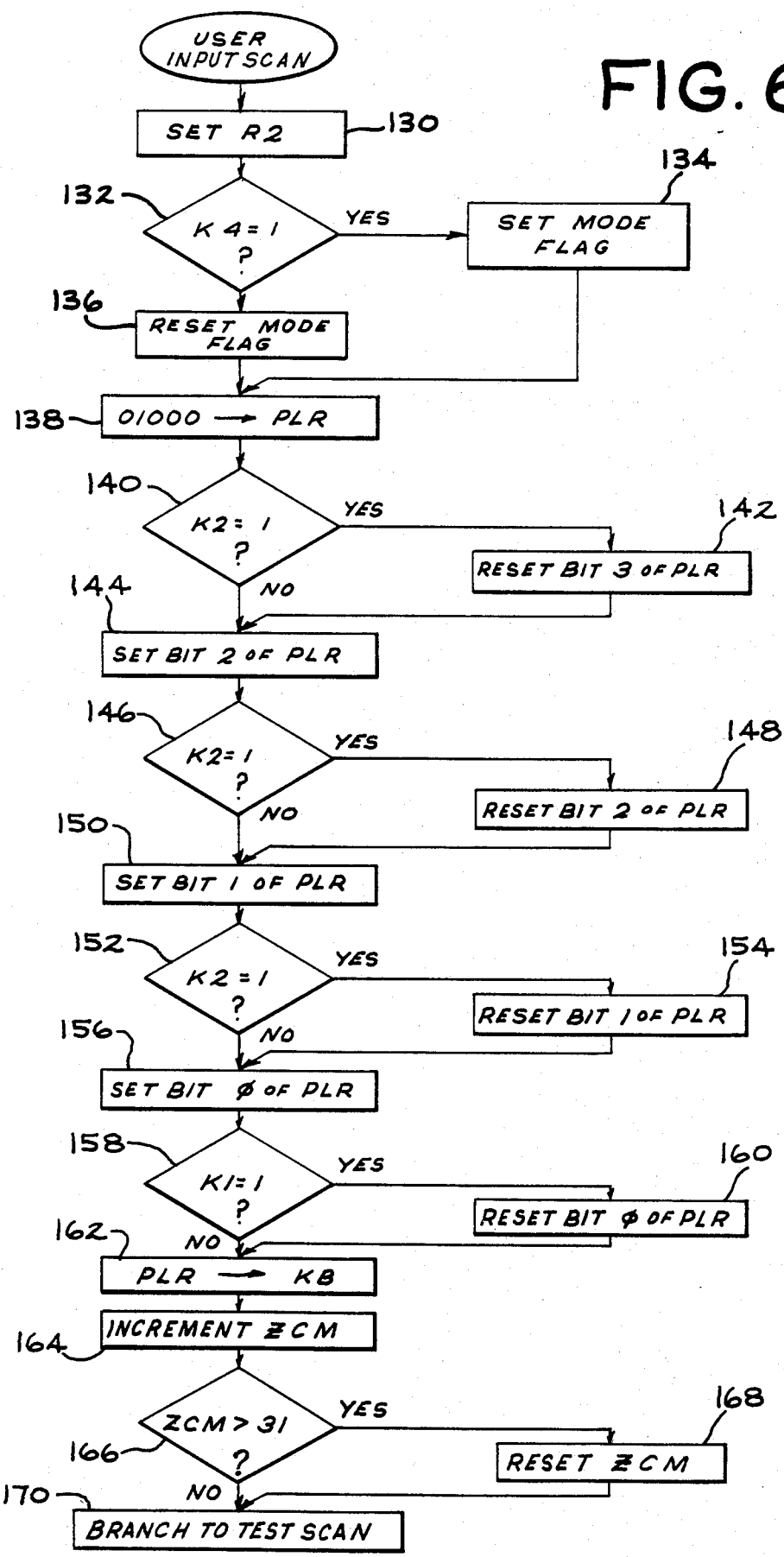
FIG. 6 is a flow diagram of the USER INPUT SCAN routine incorporated in the control program for the microprocessor in the circuit of FIG. 5.

USER INPUT SCAN Routine—FIG. 6

The function of this routine is to identify the mode selected by the user via mode select switch 32 and the heating setting selected by the user via control knob 22. First, the state of mode select switch 32 is determined by setting output R2 (Block 130). Inquiry 132 then scans input port K4 to determine whether switch 32 is open (K4=0) or closed (K4=1). If K4=1, signifying selection of the Fry Mode, a Mode Flag is set for future reference in a subsequent routine (Block 134). If K4=0, signifying selection of the Boil Mode, the Mode Flag is reset (Block 136).

Following determination of the selected mode, the analog output from potentiometer 102 is converted to a digital signal. It will be recalled that there are 16 possible heat settings, each represented by a corresponding digital signal. In this routine PLR is a digital word which sets the reference voltage in the A/D conversion scheme via the resistor ladder network portion of A/D converter 76. PLR is varied in accordance with a successive approximation technique and the voltage generated at the output of operational amplifier 100 (FIG. 5) corresponding to each word is compared to the voltage signal at potentiometer arm 102a by comparator 128 to determine the power level selected.

TABLE III

| Digital Code | Corresponding Analog Voltage (volts) | Heat Setting Voltage Range (volts) | KB |
|---|---|---|---|
| 00000 | 10.00 | 10.0 | 0 |
| 00010 | 9.42 | 9.42–10.0 | 1 |
| 00100 | 8.84 | 8.84–9.42 | 2 |
| 00110 | 8.26 | 8.26–8.84 | 3 |
| 01000 | 7.67 | 7.67–8.26 | 4 |
| 01010 | 7.10 | 7.10–7.67 | 5 |
| 01100 | 6.56 | 6.56–7.10 | 6 |
| 01110 | 5.94 | 5.94–6.56 | 7 |
| 10000 | 5.35 | 5.35–5.94 | 8 |
| 10010 | 4.78 | 4.78–5.35 | 9 |
| 10100 | 4.19 | 4.19–4.78 | A |
| 10110 | 3.61 | 3.61–4.19 | B |
| 11000 | 3.02 | 3.02–3.61 | C |
| 11010 | 2.44 | 2.44–3.02 | D |
| 11100 | 1.86 | 1.86–2.44 | E |
| 11110 | 1.28 | 1.28–1.86 | F |

The digital code generated at outputs $O_0$–$O_4$ during the analog to digital conversion of the input voltage from wiper arm 102a is listed in Table III together with the corresponding analog voltage which is generated at output 124 of operational amplifier 120. The digital code in Table III is a five-bit code, whereas the aforerentioned PLR is a four-bit word. The five-bit code represents the code stored in the 0 register. The least significant bit is derived from the microprocessor status latch and the other four-bits are derived from the four-bit PLR word. Since the least significant bit is zero for the code in Table III, when performing the input scan, the status latch is reset, i.e., zero and the scan is performed by simply varying PLR and outputting the contents of PLR and the status latch to the 0-register. The column headed KB in Table III shows the hexadecimal presentation for the digital code assigned in this routine to variable KB. KB represents the selected heat setting for analog potentiometer voltages in the voltage ranges shown. Wiper arm 102a is mechanically coupled to control knob 22 such that for each heat setting, the potentiometer output voltage lies near the middle of the corresponding voltages ranges shown in Table III.

Referring now to FIG. 6, the search starts in the middle with PLR representing heat setting 7 (1000→PLR) (Block 138). The four bits of the PLR word are individually referred to hereinafter as 0, 1, 2, and 3, with 0 being the least significant bit.

This state of the output ports $O_0$–$O_4$ (10000) results in a voltage of 5.35 volts at amplifier output 124 (FIG. 5). Referring briefly back to FIG. 5, K2=1 if the voltage at wiper arm 102a of potentiometer 102 is greater than 5.35 volts signifying KB=8 or less. K2=0 signifies that the wiper arm voltage is less than 5.35 volts signifying KB greater than 8. Inquiry 140 determines if the voltage representing the selected heat setting is higher (K2=1) signifying a lower selected heat setting or lower (K2=0) signifying a higher selected heat setting. If K2=1, PLR is set equal to 4 by resetting Bit 3 (Block 142) and setting Bit 2 (Block 144) (0100→PLR). If K2=0, PLR is set equal to 12 by simply setting Bit 2 (1100→PLR) (Block 144). Inquiry 146 determines if the selected heat is higher or lower than the present PLR. If lower (K2=1), PLR is decreased by 2 by resetting Bit 2 (Block 148) and setting the Bit 1. If higher (K2=0), the PLR is increased by 2 by setting Bit 1 (Block 150).

Inquiry 152 determines whether the selected heat setting higher or lower than the present value PLR. If lower (K2=1), PLR is decreased by 2 by resetting Bit 1 (Block 154) and setting Bit 0 (Block 156). If higher (K2=0), PLR is increased by 1 by setting Bit 1 (Block 156).

Inquiry 158 repeats the higher or lower task. If lower (K2=1), PLR is reduced by one by resetting Bit 0 (Block 160) and then PLR is read into KB (Block 162). If higher (K2=0), PLR is read into KB (Block 162). Memory location KB now stores a digital signal representing the selected power setting. The designator KB will hereinafter be used interchangeably with reference to the memory location and the signal itself. The specific meaning will be clear from the context.

Finally, the aaster counter (ZCM) which controls the duration of the control period is incremented (Block 164). It will be recalled that the control period is approximately 4.4 seconds corresponding to 32 control intervals. This routine is executed once every 133 milliseconds. Thus, the ZCM counter functions as a 32 count ring counter. The ZCM count is checked by Inquiry 166. If ZCM is greater than 31, ZCM is reset (Block 168). The ZCM count is utilized in the Power Out routine to be hereinafter described. The program now branches (Block 170) to the TEMP SCAN routine (FIG. 7A).

Figure 7A:
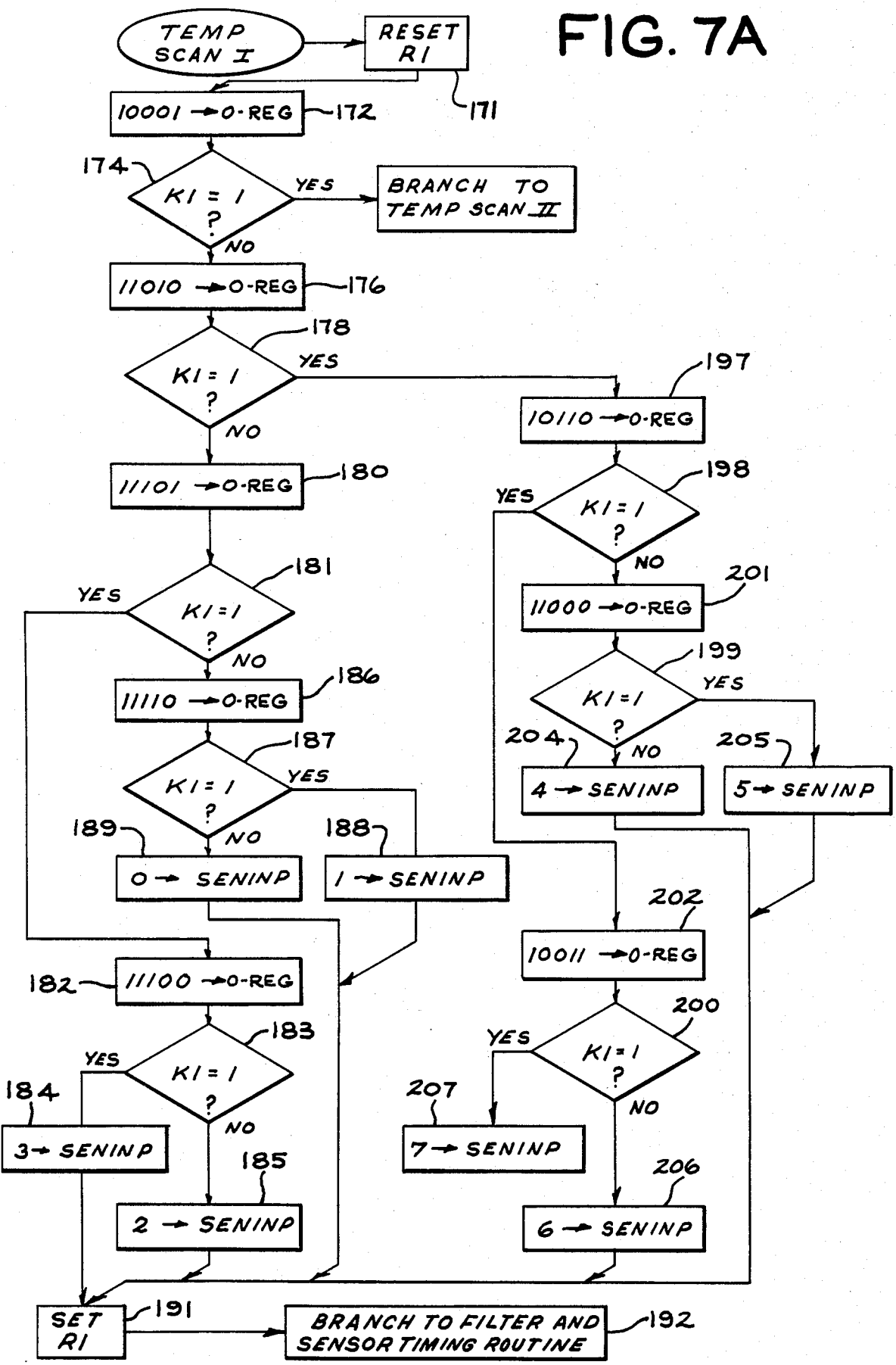
FIGS. 7A and 7B are flow diagrams of the TEMPERATURE SCAN routine incorporated in the control program for the microprocessor in the circuit of FIG. 5.
Figure 7B:
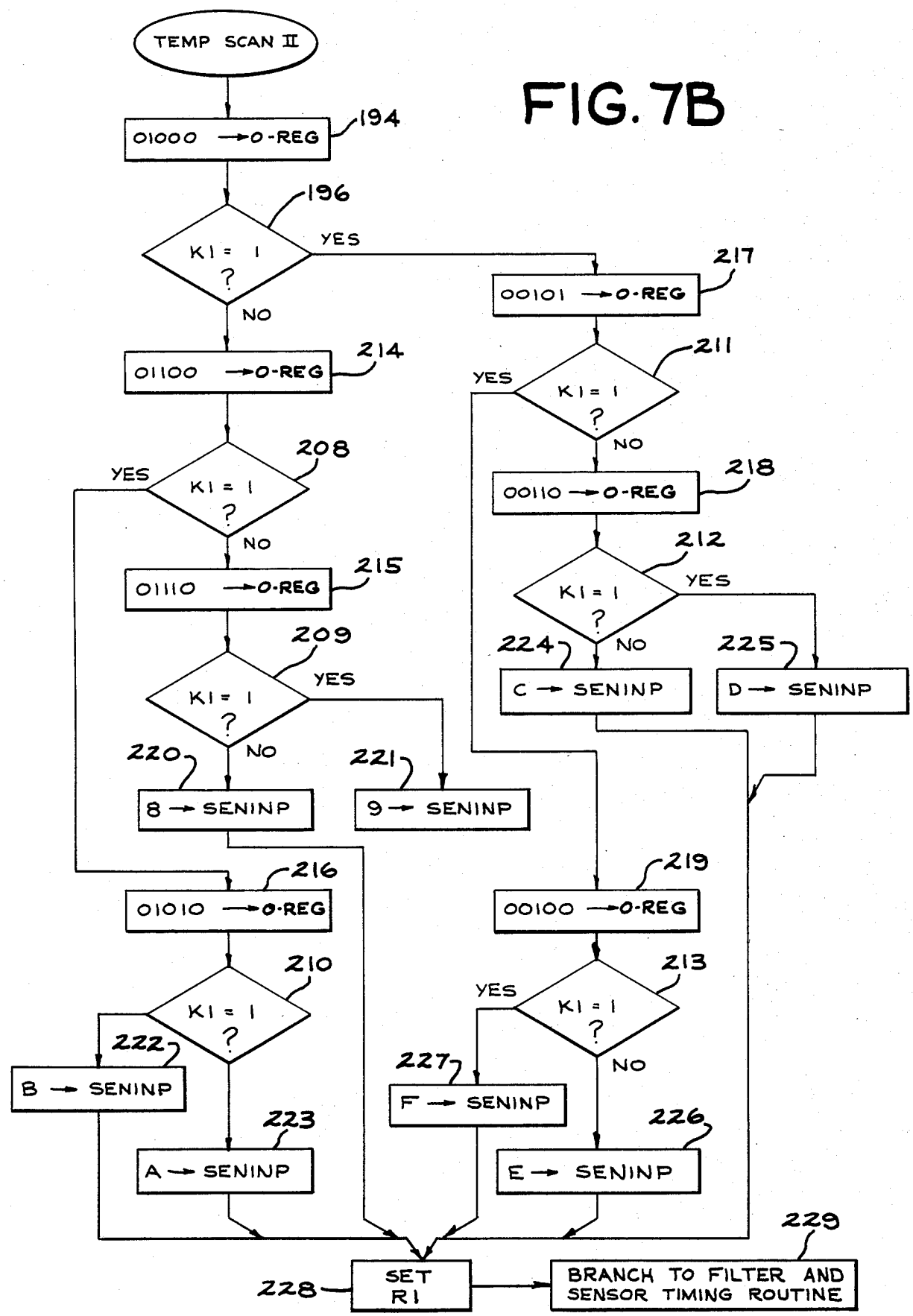

TEMP SCAN Routine—FIGS. 7A and 7B

The function of this routine is to convert the analog voltage at output 124 of amplifier 120 (FIG. 5) representing the sensed utensil temperature to a digital signal representative of the sensed utensil temperature. More specifically, this routine determines within which of the 15 predetermined temperature ranges the current sensed utensil temperature falls. A hexadecimal value is assigned to each of the 15 temperature ranges, as shown in Table IV. The relationship of the value of the various temperature variables used in the routines to be hereinafter described including SENINP and SENOUT to temperature is defined by Table IV.

TABLE IV

| Hex Rep | Temp. Range-°F. | Code | Analog Volts | Threshold T° F. |
|---|---|---|---|---|
| 0 | T < 121 | 11110 | 1.28 | |
| 1 | 121 ≦ T < 147 | 11101 | 1.57 | 121 |
| 2 | 147 ≦ T < 167 | 11100 | 1.86 | 147 |
| 3 | 167 ≦ T < 198 | 11010 | 2.44 | 167 |
| 4 | 198 ≦ T < 220 | 11000 | 3.02 | 198 |
| 5 | 220 ≦ T < 241 | 10110 | 3.61 | 220 |
| 6 | 241 ≦ T < 269 | 10011 | 4.48 | 241 |
| 7 | 269 ≦ T < 287 | 10001 | 5.06 | 269 |
| 8 | 287 ≦ T < 316 | 01110 | 5.94 | 287 |
| 9 | 316 ≦ T < 336 | 01100 | 6.56 | 316 |
| A | 336 ≦ T < 360 | 01010 | 7.10 | 336 |
| B | 360 ≦ T < 387 | 01000 | 7.67 | 360 |
| C | 387 ≦ T < 423 | 00110 | 8.26 | 387 |
| D | 423 ≦ T < 444 | 00101 | 8.55 | 423 |
| E | 444 ≦ T < 472 | 00100 | 8.84 | 444 |
| F | 472 ≦ T | 00010 | 9.42 | 472 |

Referring now to FIGS. 7A and 7B, R1 is reset (Block 171) to turn off transistor Q1 (FIG. 5) thereby enabling energization of thermistor 104. The search for the sensed temperature range begins by setting the five-bit 0-register (OREG) to 10001 corresponding to a reference temperature of 287° F. (Block 172). As in the User Input Routine, the five-bit code for the 0-register is derived from the four-bit accumulator and the status latch. However, unlike the User Input Routine, in this routine the state of the status latch is also varied to generate the desired five-bit codes. Inquiry 174 determines whether the sensed temperature is greater (K1=1) or less (K1=0) than 287° F. If less, the OREG code is changed to 11010 (Block 176) corresponding to a reference temperature of 198° F. Inquiry 178 determines if the sensed temperature is less than (K1=0) or greater than (K1=1) 198°. If less, the OREG code is changed to 11101 (Block 180) corresponding to a reference temperature of 147°; and Inquiry 181 determines if the sensed temperature is greater (K1=1) or less (K1=0) than 147°. If the sensed temperature is greater than 147°, OREG is changed to 11100 (Block 182) corresponding to a reference temperature of 167°. Inquiry 183 determines if the sensed temperature is greater (K1=1) or less (K1=0) than 167°. If the sensed temperature is greater than 167° (K1=1), sensor input variable SENINP is set equal to 3 (Block 184) which represents a sensed temperature greater than 167° F. and less than 198°. If the temperature is less than 167° (K1=0) Inquiry 183), SENINP is set equal to 2 (Block 185), representing a sensed temperature greater than 147° and less than 167°.

Figure 8:
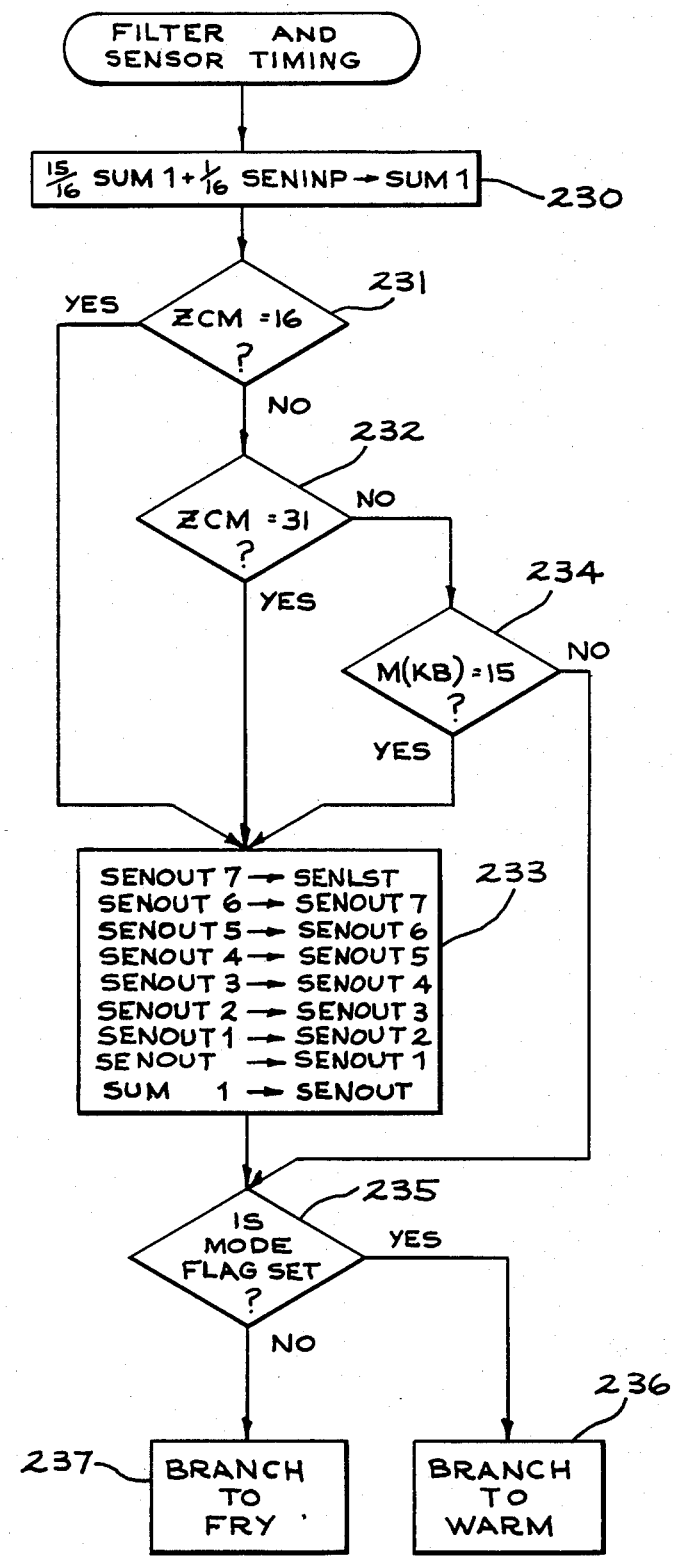
FIG. 8 is a flow diagram of the SENSOR FILTER and TIMING routine incorporated in the control program for the microprocessor in the circuit of FIG. 5.

Referring back to Inquiry 181, if the sensed temperature is less than 147° F., OREG is changed to 11110 (Block 186) corresponding to a reference temperature of 121° F. Inquiry 187 determines if the sensed temperature is greater (K1=1) or less than (K1=0) 121° F. If greater, SENINP is set to 1 (Block 188) representing a temperature greater than 121° F. and less than 147° F. If less, SENINP is set to 0 (Block 189) representing a sensed temperature less than 121° F. Once the sensed temperature range is determined, R1 is set (Block 191) turning off transistor Q1 thereby de-energizing thermistor 104, and the program branches (Block 192) to the FILTER and SENSOR TIMING routine (FIG. 8).

If at Inquiry 178 the sensed temperature is greater than 198° F. (K1=1), the 0 register code is changed to 10110 (Block 197). Inquiries 198, 199 and 200 would check for sensed temperatures greater than 241° F., 220° F. and 269° F., respectively. Blocks 201 and 202 would appropriately set the 0 register code, and Blocks 204, 205, 206 and 207 would assign the appropriate one of temperature range code 4, 5, 6 and 7, respectively, to SENINP.

Similarly, if Inquiry 174 determines K1 equals zero, signifying a sensed utensil temperature greater than 287° F., the program branches to Block 194 (FIG. 7B) where the 0-register code is changed to 01000 representing 387°. Inquiry 196 determines if the sensed utensil temperature is greater (K1=1) or less than (K1=0) 387° F. Such comparisons are repeated by Inquiries 208–213 until the temperature is found to lie in one of the sixteen ranges. Blocks 214–219 appropriately set the 0-register code, and the appropriate one of Blocks 220–227 assigns the appropriate one of temperature range codes 8, 9, A, B, C, D, E, F, respectively, to variable SENINP. The program then branches to the SENSOR FILTER and TIMING routine (FIG. 8).

While in the illustrative embodiment the USER INPUT SCAN routine is executed before the TEMP SCAN routine, these routines could just as well be executed in reverse order.

SENSOR FILTER and TIMING Routine—FIG. 8

This routine performs the dual function of iteratively filtering the sensor output temperature signal designated SENINP, controlling the timing of the updating of the temperature signal which is actually used in the control routines yet to be described and storing a plurality of successive temperature measurements. The filter function is implemented to minimize the impact of aberrant temperature measurement inputs from the temperature monitoring circuit; the timing function is implemented to minimize the effect of radiant energy from the heating element 12 impinging on thermistor 104 on the accuracy of the temperature measurements; and the storage of successive measurements in memory is used in the Boil Dry routine to determine the rate of increase of the sensed utensil temperature in detecting a "boil dry" condition.

The iterative filter portion of this routine attaches relatively little weight to each individual input. Hence, isolated erroneous inputs are averaged out so as to have little effect on the accuracy of the cumulative average signal provided by the filter routine. Referring to FIG. 8, the filter function is performed by Block 230. It will be recalled that SENINP is the hexadecimal representation of the temperature range for the sensed utensil temperature determined in the hereinbefore described TEMP SCAN routine. One-sixteenth of the new SENINP input is added to 15/16 of the filter output variable designated SUM 1 from the previous pass through this routine. The resultant sum becomes the new value for the filter output variable SUM 1.

A new temperature input signal SENINP is processed by the filter portion of this routine to generate a new SUM 1, during each pass through the control routine, i.e. once every 133 milliseconds corresponding to 8 cycles of the 60 Hz power signal. However, to minimize the effects of radiant energy from heating element 12 on sensor inputs, the sensed utensil temperature signal which is input to the power control portion of the control program is updated during selected portions of the 4.4 second duty cycle control period.

It will be recalled that the ZCM counter operates as a 32 count ring counter, i.e. the counter counts from 0-31 and resets to 0. In the duty cycle control implemented in the POWER OUT routine to be hereinafter described, for duty cycles less than 100% the heating element is energized during the first part of the control period when the ZCM count is relatively low and de-energized while the ZCM count is relatively high. Since, except when operating at the 100% power level, the heating element is always de-energized for count 31, radiant energy effects on the sensor are minimum at ZCM count 31. Thus, radiation effects are minimized by updating SENOUT, the temperature signal utilized in implementation of the Power Control routine only at count 31. It is desirable, however, to have at least two updates of SENOUT during each 4.4 second control period, to limit oscillations between inputs. Hence, SENOUT is also updated at the midpoint of the control period, i.e. at count 16. There is potentially more error due to radiation effects for this measurement; however, the heating element is de-energized at this point for the twelve lower power levels. Hence, the effects of radiation even on this measurement are minimum except at the highest 4 power levels.

When the heating element is operated at 100% duty cycle, the radiation effects are the same at all counts; hence, for maximum accuracy SENOUT is updated during each execution of the control program, i.e. every 133 milliseconds.

Referring again to the flow diagram of FIG. 8, Inquiries 231 and 232 look for ZCM counts of 16 and 31, respectively. Upon the occurrence of either count, SENOUT is updated by the then current value of SUM 1 (Block 233). Otherwise, Inquiry 234 checks to determine if the power level presently being implemented is the 100% power level (M(KB)=15). If it is, SENOUT is updated by SUM 1 (Block 233) regardless of the count; if not, Block 233 is bypassed, and SENOUT is not updated during this pass. In this fashion for power levels lower than 15, SENOUT is updated only on counts 16 and 31, and when power level 15 is being implemented SENOUT is updated every count. As shown in Block 233, when SENOUT is updated, the previous SENOUT is stored as SENOUT 1; the previous SENOUT 1 is stored as SENOUT 2; the previous SENOUT 2 is stored as SENOUT 3; the previous SENOUT 3 is stored as SENOUT 4; the previous SENOUT 4 is stored as SENOUT 5; the previous SENOUT 5 is stored as SENOUT 6; the previous SENOUT 6 is stored as SENOUT 7; and the previous SENOUT 7 is stored as SENLST. By storing successive measurements in this fashion, the time span between the most recent or last received temperature input SENOUT and the oldest or last received of the stored signals SENLST is approximately 16 seconds. As will be described in the Delta Boil routine (FIG. 13), SENOUT and SENLST are used to compute the rate of changes of the sensed utensil temperature to detect a "boil dry" condition.

Inquiry 235 checks the state of the Mode Flag. If set, signifying selection of the Boil Mode, the program branches (Block 236) to the WARM Routine (FIG. 9); if reset, signifying the selection of the Fry Mode, the program branches to the FRY Routine, the description of which is omitted as it is not a part of the subject invention. An example of a Fry Routine is described in the aforementioned pending application Ser. No. 586,052.

Figure 9:
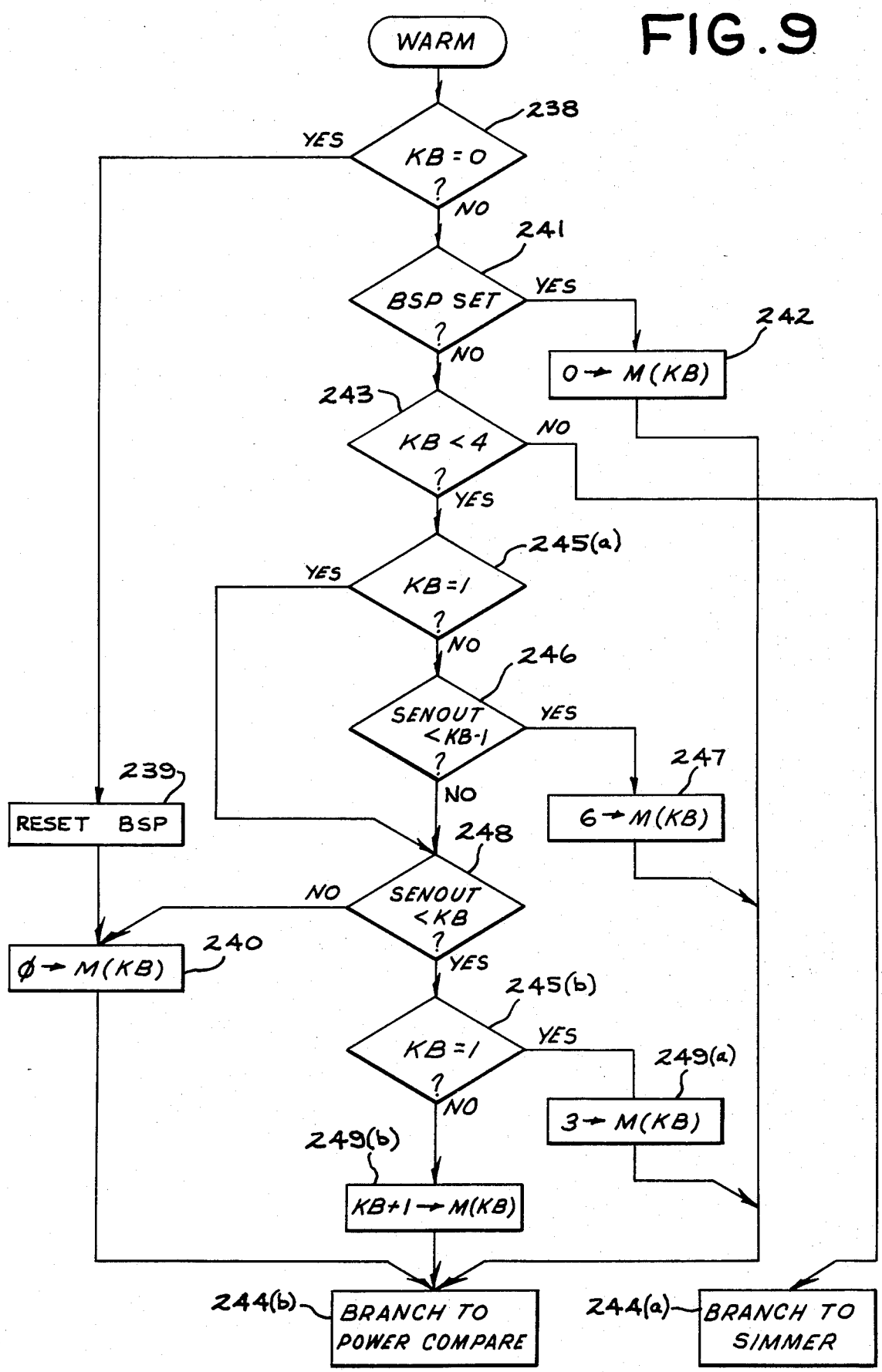
FIG. 9 is a flow diagram of the WARM routine incorporated in the control program of the microprocessor in the circuit of FIG. 5.

WARM Routine—FIG. 9

This routine is entered from the Filter and Sensor Timing routine (FIG. 8) whenever the general Boil Mode is selected by mode switch 32. The function of this routine is to implement the Warm Mode.

Figure 12:
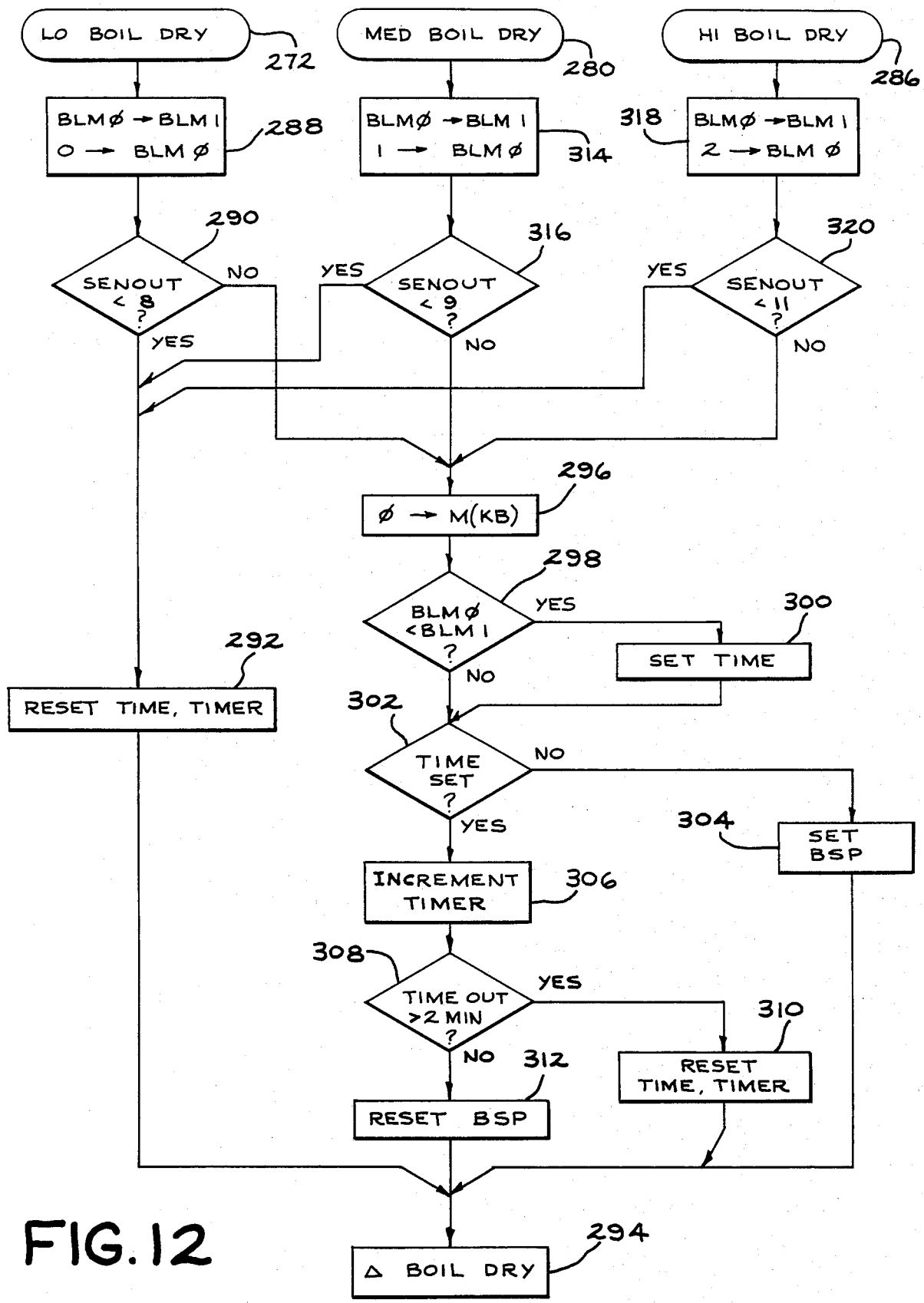
FIG. 12 is a flow diagram of the TEMP BOIL DRY routine incorporated in the control program of the microprocessor in the circuit of FIG. 5.
Figure 13:
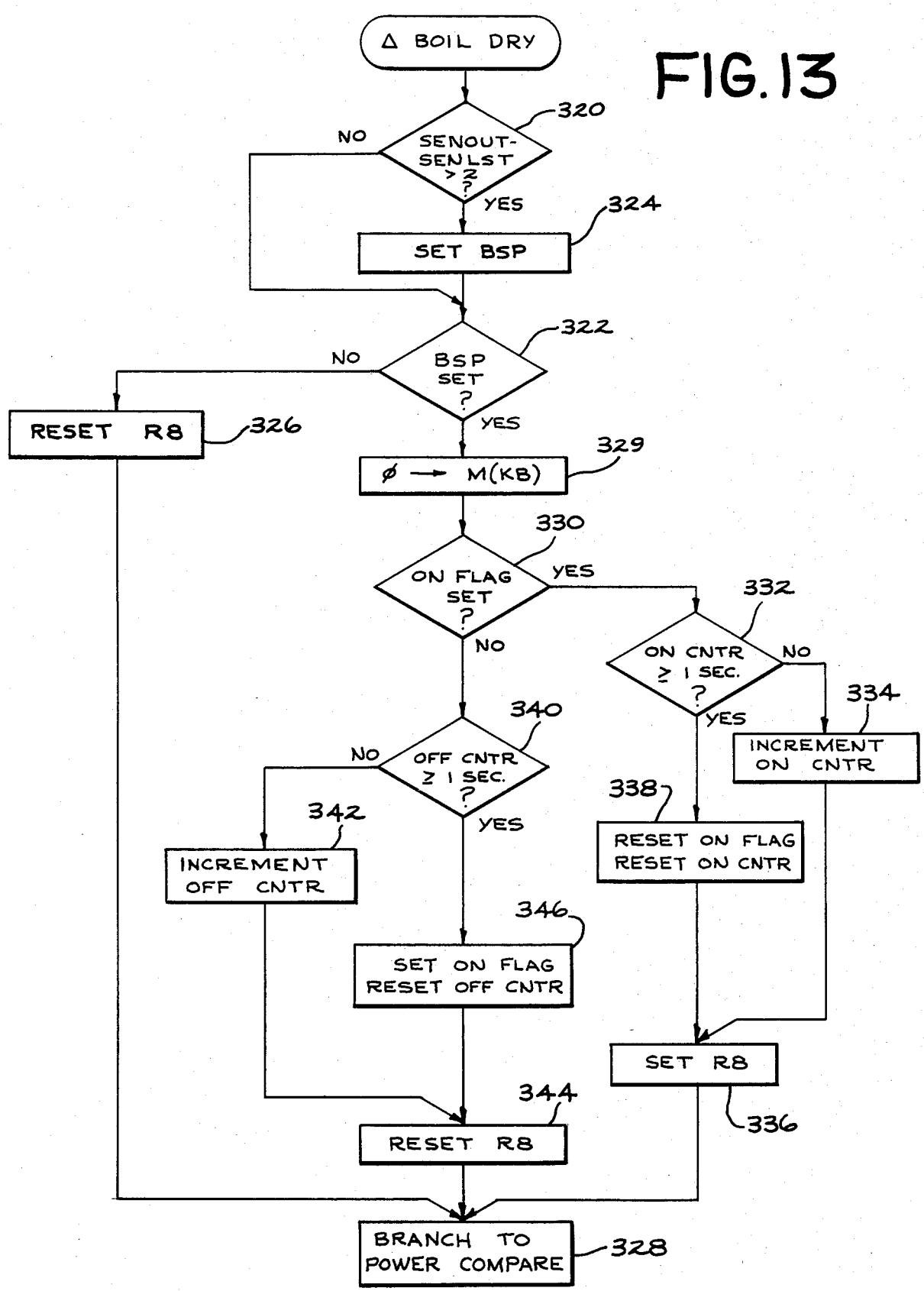
FIG. 13 is a flow diagram of the DELTA BOIL DRY routine incorporated in the control program of the microprocessor in the circuit of FIG. 5.

One additional function is performed by this routine which is not related to implementation of the Warm routine, but rather to the hereinafter described boil dry routines (FIGS. 12 and 13). When a boil dry condition is detected, even though the surface unit is de-energized automatically upon detection, it is desirable to require the user to terminate the cycle by selecting OFF before any other heat settings are implemented. This requirement is met by the initial instructions of the Warm routine which is the initial power control routine to be entered each pass through the control program following the scanning for user and temperature input. In describing these initial instructions, reference will be made to a BSP latch. This latch is set in the boil dry routines upon detection of a boil dry condition. When set, power setting zero (OFF) is implemented. The latch may be reset by the user by selecting the OFF setting. Once BSP is reset by selection of the OFF setting, the control program will thereafter recognize other heat settings.

Figure 14A:
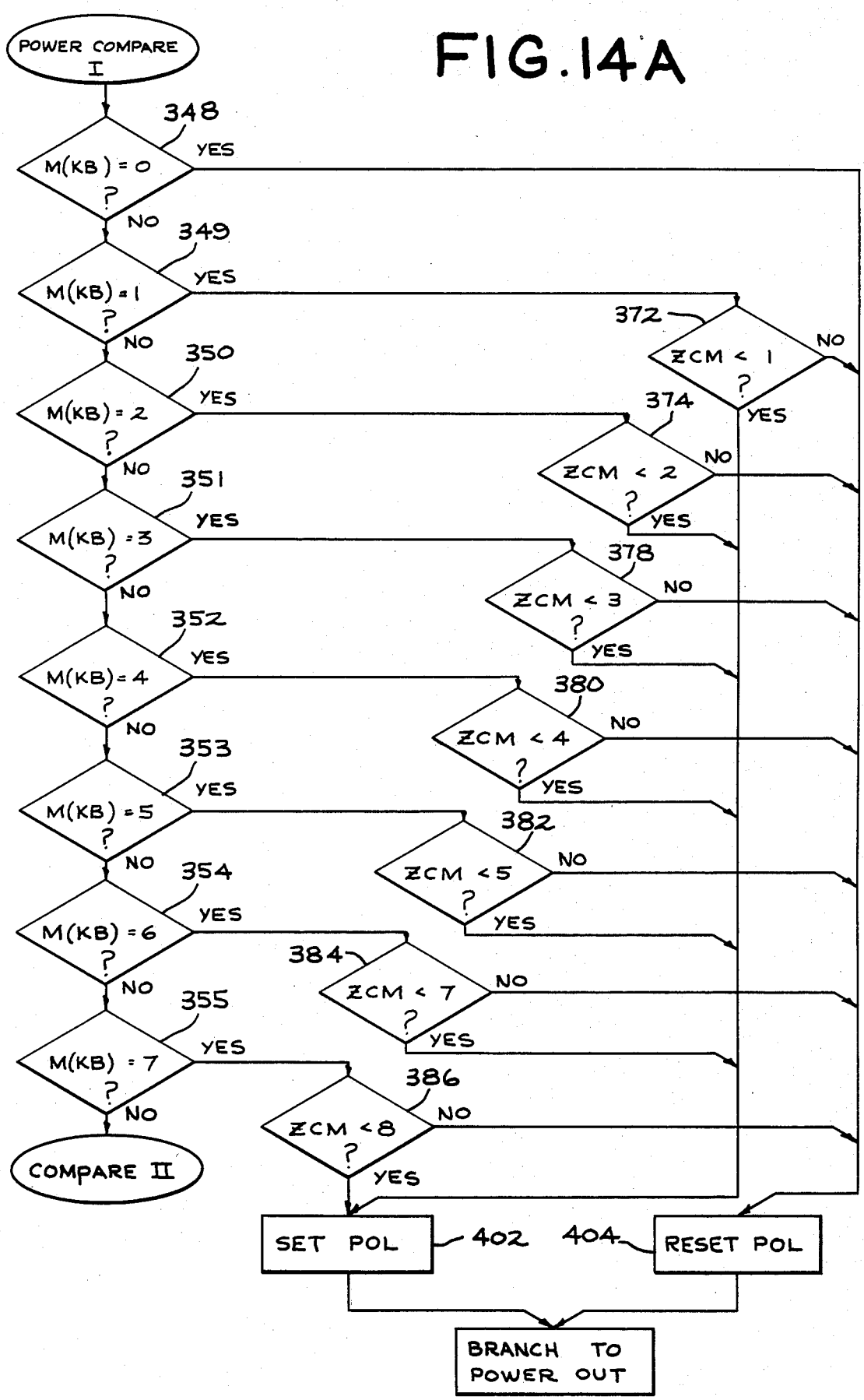
FIGS. 14A and 14B depict the flow diagram of the POWER COMPARE routine incorporated in the control program of the microprocessor in the circuit of FIG. 5.

Referring now to the flow chart of FIG. 9, Inquiry 238 checks for KB=0 signifying user selection of the OFF setting. If yes, the BSP latch is reset and M(KB) is set to zero (Block 239 and 240 respectively), thereby implementing the OFF setting, and the program branches (Block 244(b)) to the Power Compare routine (FIG. 14A). If KB is not zero, Inquiry 241 checks the state of the BSP latch. If set, M(KB) is set to zero (Block 242) and the program branches (Block 244(b)) to the Power Compare routine (FIG. 14A), thereby ignoring the heat setting and causing the Power Compare routine to implement the zero or OFF power setting. If BSP is not set, the program proceeds with the Warm routine. As will become apparent in the description of the Power Compare routine, M(KB) is the variable utilized in that routine to implement the appropriate duty cycle. The duty cycle associated with each value of M(KB) is illustrated in Table I.

Figure 10:
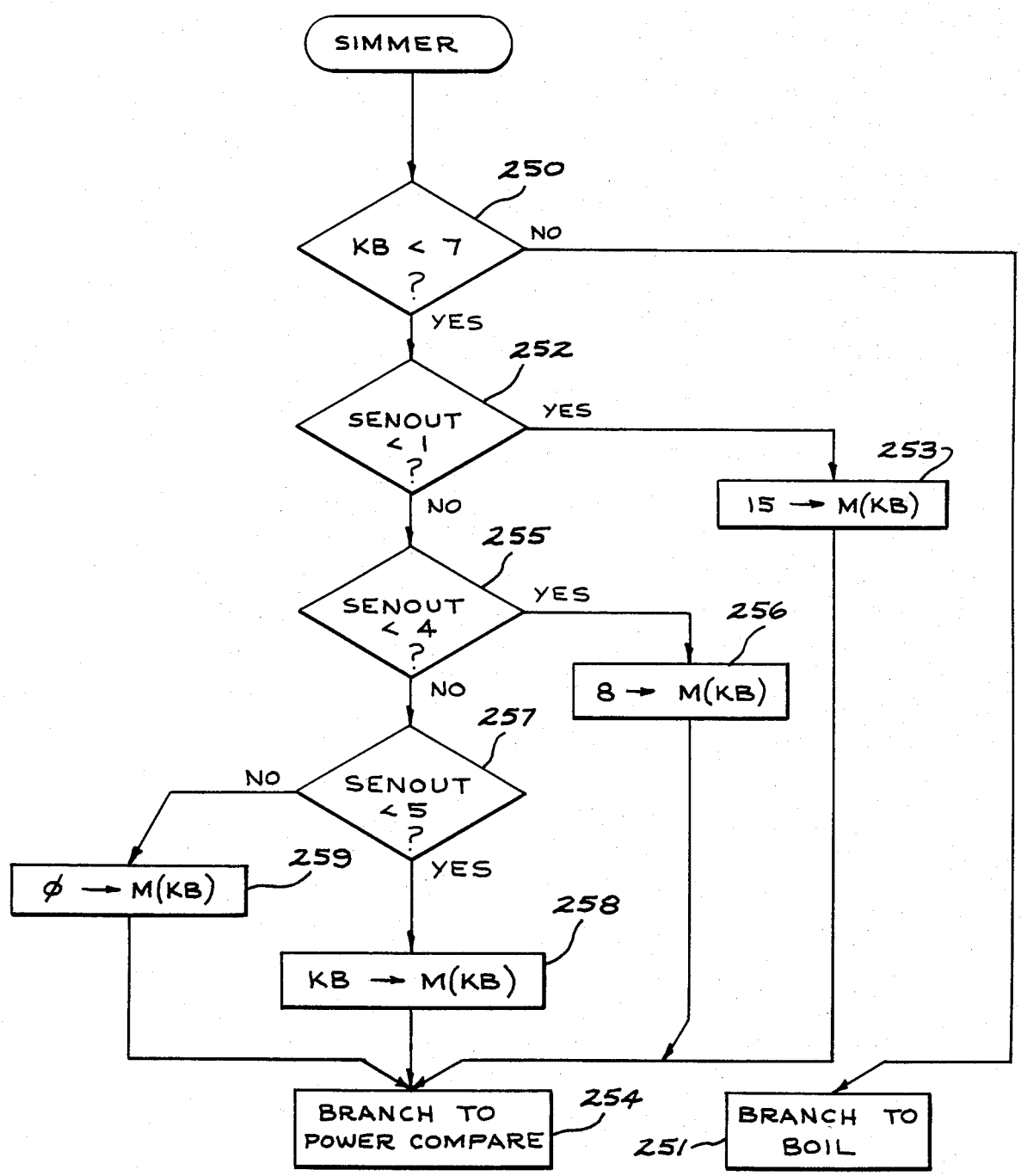
FIG. 10 is a flow diagram of the SIMMER routine incorporated in the control program of the microprocessor in the circuit of FIG. 5.

Inquiry 243 checks for a heat setting less than setting 4. In the general Boil Mode, heat settings 1, 2 and 3 are the Warm Mode heat settings. If a heat setting other than 1, 2 or 3 is selected (KB>4), the program branches (Block 244(a)) to the Simmer routine (FIG. 10). If one of heat settings 1-3 has been selected, the program proceeds to Inquiry 245(a) which determines if heat setting Wm(1) (KB=1) is selected. If not, the program proceeds to Inquiry 246. Inquiry 246 determines if the sensed utensil temperature variable SENOUT is less than KB−1, signifying a sensed utensil temperature less than 121° F. and 147° F. for Wm(2) and Wm(3) respectively. If SENOUT is less than KB−1, implementation of power level 6 is signified by placing a 6 in M(KB) (Block 247). The program then branches (Block 244(b)) to the Power Compare routine (FIG. 14A).

Referring again to Inquiry 246, if the sensed utensil temperature is not less than (KB−1), the program proceeds to Inquiry 248 which checks for the upper temperature limit. In the event Inquiry 245(a) determines that Wm(1) has been selected (KB=1), then Inquiry 246 is bypassed and the program proceeds directly to Inquiry 248. For heat settings KB=1, KB=2 and KB=3 the maximum warm temperature limits are 121°, 147°, and 167° F. corresponding to SENOUT=1, SENOUT=2, and SENOUT=3, respectively. If Inquiry 248 determines that the sensed utensil temperature is less than the maximum warm reference temperature for the selected heat setting (SENOUT<KB), Inquiry 245(b) checks for KB=1. If Wm(1) is selected (KB=1), power level 3 is set by setting M(KB) to 3 (Block 249(a)). If Wm(1) is not selected, the steady state power level associated with the heat setting is set by setting M(KB) to (KB+1) (Block 249(b)). This implements the steady state power levels 3, 3, and 4 for heat settings 1, 2 and 3, respectively, corresponding to duty cycles of 9%, 9% and 12.5%, respectively (See Tables I and III). If the sensed utensil temperature is not less than the maximum warm reference temperature, M(KB) is set to 0 (Block 240) corresponding to the zero or OFF power level. M(KB) having been set by the appropriate one of blocks 240, 242, 247, 249(a) and 249(b), the program then branches (Block 244(b)) to the Power Compare routine (FIG. 14A).

SIMMER Routine—FIG. 10

The function of this routine is to implement the Simmer Mode. The user initiates the Simmer Mode by first selecting the General Boil Mode via mode select switch 32 and then by selecting one of heat settings 4–6 via control knob 22 (FIGS. 1 and 2). This routine is entered from the Warm routine (FIG. 9) whenever the General Boil Mode has been selected and the selected heat setting is greater than 3.

It will be recalled that the function of the Simmer Mode is to bring water loads rapidly to a temperature level close to the boiling point and holding that temperature without actually boiling. To this end, the heating element is energized at a relatively high predetermined power level when the sensed utensil temperature is less than a predetermined minimum simmer reference temperature. In the illustrative embodiment, the heating element is operated at power level 15 (100% duty cycle) as long as the sensed utensil temperature less than 121° F. For sensed utensil temperatures greater than the minimum simmer reference (121° F.) and less than an intermediate simmer reference temperature, the heating element is operated at an intermediate power level. In the illustrative embodiment, the intermediate reference temperature is 198° F. and the intermediate power level is power level 8 (31.5% duty cycle). For sensed utensil temperatures greater than the intermediate reference temperature (198° F.) and less than a maximum simmer reference temperature, the heating element is operated at the power level associated with the selected heating setting. In the illustrative embodiment, the maximum simmer reference temperature is 220° F. and the power levels are 4–6 for heat settings 4–6, respectively.

For sensed utensil temperatures greater than the maximum simmer reference temperature (220° F.) the heating elerent is de-energized, i.e. power level 0 is implemented.

Figure 11:
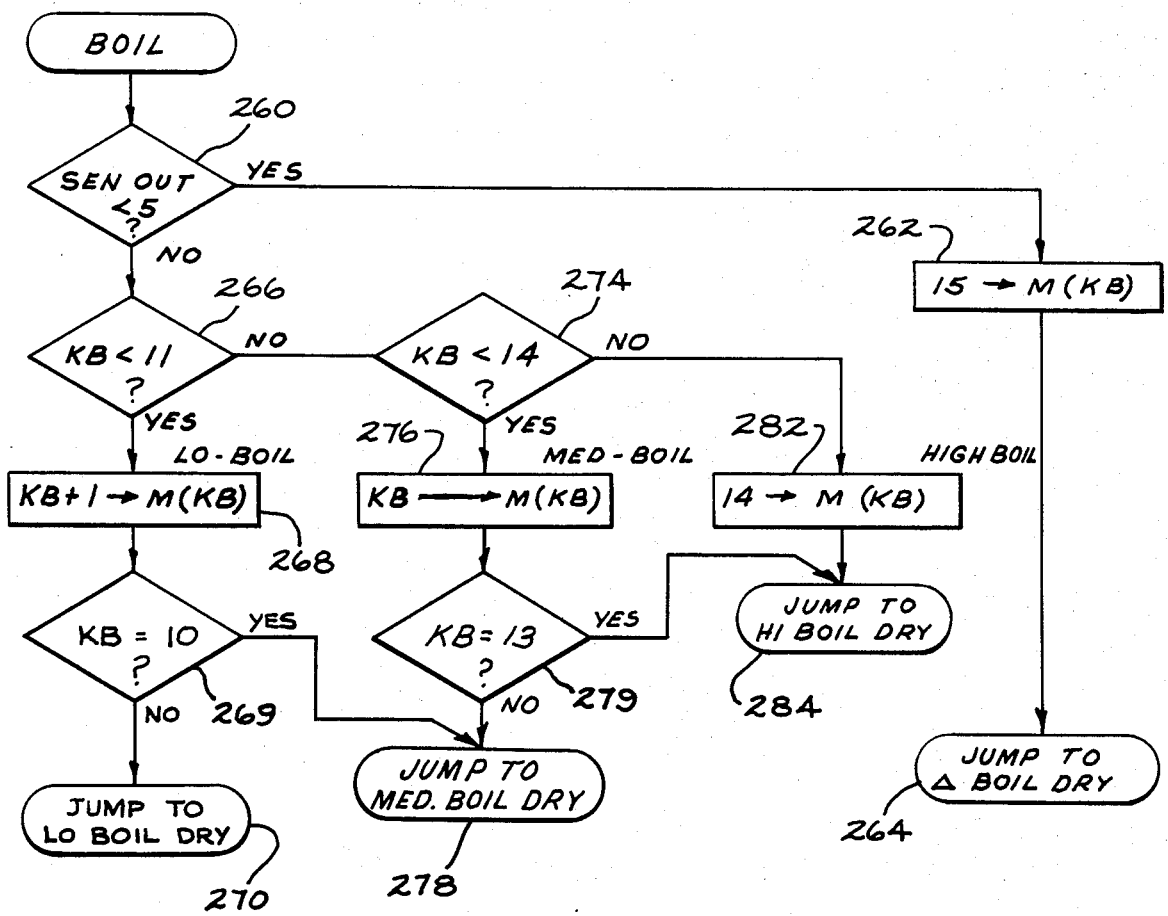
FIG. 11 is a flow diagram of the BOIL routine incorporated in the control program of the microprocessor in the circuit of FIG. 5.

Referring now to the flow diagram of FIG. 10, it will be recalled that the program enters this routine for heat settings greater than 3. Inquiry 250 looks for a heat setting selection less than 7. If KB>6, indicating a heat setting higher than 6, the program branches (Block 251 to the BOIL routine (FIG. 11). For heat settings 4–6, the program continues to Inquiry 252 which determines if the sensed utensil temperature is less than 121° F. If yes, power level 15 is signified by setting M(KB) to 15 (Block 253) and the program branches (Block 254) to the Power Compare routine (FIG. 14A). For sensed utensil temperatures greater than 121° F., Inquiry 255 determines if the sensed utensil temperature is less than 198° F. (SENOUT<4). If yes, power level 8 is set by setting M(KB) to 8 (Block 256) and the program branches (Block 254) to the Power Compare routine (FIG. 14A). If the sensed utensil temperature is greater than 198° F., Inquiry 257 determines if the sensed utensil temperature is less than 220° F. (SENOUT<5). If yes, the steady state power level for the selected heat setting is set by setting M(KB) to KB (Block 258) and the program branches (Block 254) to the Power Compare routine (FIG. 14A). If the sensed utensil temperature is greater than 220°, the zero power level is set by setting M(KB) to zero (Block 259) and the program branches (Block 254) to the Power Compare routine, FIG. 14A.

BOIL Routine—FIG. 11

This routine is entered from the Simmer routine (FIG. 10) when the Boil Mode is selected and the heat setting is one of the Lo, Med or Hi Boil settings. Its function is to implement the actual Boil Modes. In the actual Boil Modes, the water loads are brought to a boil with the boil rate being determined by the heat setting selected by the user. It will be recalled that in the Boil Mode the heating element is energized at a predetermined high power level until the sensed utensil temperature exceeds a predetermined minimum boil reference temperature. In the illustrative embodiment, the minimum reference temperature is 220° F. and the high power level is power level 15 (100% duty cycle). When the sensed utensil temperature is greater than the minimum reference temperature, the heating element is energized at the steady state power level associated with the selected heat setting. The associated steady state power levels for settings 7-10 are 8-11, respectively. For heat settings 11-13 the associated steady state power levels are 11-13 respectively. For both heat settings 14 and 15 the associated steady state power level is 14.

Referring now to the flow diagram of FIG. 11, Inquiry 260 determines if the sensed utensil temperature is less than the minimum boil reference temperature of 220° F. (SENOUT<5). If it is, power level 15 is set by setting M(KB) to 15 (Block 262) and the program branches (Block 264) to the Delta Boil Dry routine (FIG. 13). If the sensed utensil temperature is greater than 220°, Inquiry 266 determines if one of heat settings 7-10 (KB<11) has been selected. For heat settings 7-10, the appropriate one of steady power levels 8-11, respectively, is set by setting M(KB) to KB+1 (Block 268). Inquiry 269 determines if KB=10. If not, the program branches (Block 270) to the Temp Boil Dry routine (FIG. 12) at the Lo Boil Entry Point 272. If KB=10, the program branches (Block 278) to the Temp Boil Dry routine at the Med Boil Entry Point 280.

If KB is not less than 11, Inquiry 274 looks for heat settings 11-13 (KB<14) For heat settings 11-13, the appropriate one of steady state power levels 11-13, respectively, is set by setting M(KB) to KB (Block 276). Inquiry 279 determines if KB=13. If not, the program branches (Block 278) to the Med Boil Dry entry point (Block 280) of the Temp Boil Dry routine (FIG. 12). If KB equals 13, the program branches (Block 284) to the Temp Boil Dry Routine at the Hi Boil Dry entry point.

If KB is not less than 14, the selected power level is either 1-4 or 15. Selection of settings 14 or 15 causes steady state power level 14 to be implemented by setting M(KB) to 14 (Block 282). The program then branches (Block 284) to the Temp Boil Dry routine (FIG. 12) at its Boil Dry entry point (Block 286).

TEMP BOIL DRY Routine—FIG. 12

This routine is entered at one of three entry points from the Boil routine (FIG. 11) depending upon the heat setting selected. The function of the Temp Boil Dry routine is to compare the sensed utensil temperature with the maximim temperature reference for the selected Boil Mode to detect the occurrence of a "boil dry" condition, which condition is signified by a sensed temperature greater than the reference temperature. This routine also provides the means for detecting a change in boil mode selection and means for inhibiting the response of the control means to the results of the comparison during the transient time period of predetermined duration following the detection of change in Boil Mode selection from a relatively higher to a relatively lower one of the Lo, Med and Hi Boil Modes.

In this routine, the variable BLM0 is used to represent the current Boil Mode selection with the values 0, 1, and 2 used to represent the Lo, Med and Hi Boil Modes, respectively. The variable BLM1 represents the Boil Mode selection from the previous pass through this routine. These variables are compared to detect a change in mode selection.

When a boil dry condition is detected, a flag designated BSP is set. Detection of a change from a higher boil mode to a lower boil mode is signified by setting a flag designated TIME. The timer which controls the duration of the transient time period following detection of such a mode selection change is designated TIMER. When KB is less than 10 as determined in the Boil routine (FIG. 11), the Temp Boil Dry routine is entered at Block 272. The variable BLM0 which at this point in the routine represents the mode selection from the previous pass through the routine is stored as BLM1, and then BLM0 is set to zero signifying that the current mode selection is the Lo Boil Mode (Block 288). Inquiry 290 determines if the sensed utensil temperature is less than the maximum reference temperature of 287° F. (SENOUT<8) for the Lo Boil Mode. If it is, the time period flag designated TIME is reset and the time period timer (TIMER) is reset (Block 292). The program then branches (Block 294) to the Delta Boil Dry routine (FIG. 13). If Inquiry 290 indicates a sensed utensil temperature greater than 287° F., M(KB) is set to the zero or OFF power level (Block 296).

Inquiry 298 determines if BLM0 representing the new mode selection is less than the BLM1 representing the mode selection from the previous pass. If it is, this signifies that the Lo Boil Mode selection represents a change in mode selection from either Med Boil or Hi Boil. The TIME flag is set (Block 300). The TIME flag, when set, inhibits the setting of the BSP flag signifying the detection of a boil dry condition, during the transient time period following detection of the change to a lower mode selection. Inquiry 302 checks the state of the TIME flag to determine whether or not the BSP flag should be set. If the TIME flag is not set, the BSP flag is set (Block 304) and the program branches (Block 294) to the Delta Boil Dry routine (FIG. 13).

Block 306, Inquiry 308 and Block 310 control the duration of the transient time period. When Inquiry 302 signifies that the TIME flag is set, TIMER is incremented (Block 306). Inquiry 308 determines if the period has time out. When Inquiry 308 determines that the 2-minute period has expired, TIME and TIMER are reset (Block 310) and the program branches (Block 294) to the Delta Boil Dry routine (FIG. 13). If the period has not expired, BSP is reset (Block 312) and the program branches (Block 294) to the Delta Boil Dry routine (FIG. 13).

If the Temp Boil Dry routine is entered at entry point 280 indicating that the current mode selection is the Med Boil Mode, BLM0 is stored as BLM1 and BLM0 is then updated to the value 1 (Block 314). Inquiry 316 determines if the sensed utensil temperature is less than the maximum reference temperature for the Med Boil Mode, which in the illustrative embodiment is 316° F. (SENOUT=9). If it is, the program proceeds to Block 292; otherwise, the program proceeds to Block 296. In either event, the program proceeds as hereinbefore described. Similarly, if the Hi Mode is selected this routine is entered at Block 286. BLM0 is stored as BLM1 and BLM0 is then set to 2 signifying that the current mode selection is the Hi Boil Mode (Block 318). Inquiry 320 determines if the sensed utensil temperature is less than the maximum reference temperature for the Hi Boil Mode, which in the illustrative embodiment is 360° F. (SENOUT=11). If it is, the program proceeds from Block 290 as hereinbefore described; otherwise, it proceeds to Block 296 as hereinbefore described.

DELTA BOIL DRY Routine—FIG. 13

This routine is entered from the Temp Boil Dry routine (FIG. 12). The Delta Boil Dry routine provides the means for detecting a rate of increase of sensed utensil temperature greater than a predetermined reference indicative of the occurrence of a boil dry condition.

This routine further controls the triggering of the indicator means to provide a user discernible warning signal to alert the user to the occurrence. In the illustrative embodiment, this signal is provided by annunciator 101 (FIG. 5) which is alternately triggered ON and OFF at one second intervals when a boil dry condition is detected.

In experiments employing a variety of typical pans with water loads it was empirically observed that when operating in the actual boil modes as hereinbefore described, boil dry conditions were characterized by rates of temperature increases on the order of 2.5°–3.0° F./second or higher. It will be recalled that except for power level 15, SENOUT is updated roughly once every 2 seconds and that 8 measurements are stored resulting in a measurement interval of approximately sixteen seconds between the oldest measurement and the newest measurement. A rate of change on the order of 2.5°–3°/second corresponds to a change of 40°–50° in a 16 second interval. Given the temperature ranges established for the illustrative boil mode power control scheme, a change of three set points above 220° F. requires a temperature increase of at least 44°. Hence, a difference of 3 set points between the first and last measurement corresponds to a rate of change of on the order of 2.5°/second or higher. For example, SENOUT will be set at 5 for a sensed utensil temperature in the 220°–241° F. range. SENOUT will increase from 5 to 6 when the sensed utensil temperature changes from 241° to just above 241° F. For a Boil Dry to be detected the sensed temperature must increase by two additional set points within the 16 second measurement interval starting with this change from 5 to 6. Hence the utensil temperature must increase from 241° F. to 287° corresponding to SENOUT equal to 8 in sixteen seconds. This 46° F. temperature difference represents the minimum temperature increase required to increase SENOUT from 5 to 8.

The 2.5°–3° F./second rate of increase associated with the change requirement will result in the detection of most boil dry conditions. It is recognized, however, that with large pans the boil dry condition may produce a rate of temperature increase less than that required to change three levels within the sixteen second measurement period. A requirement of a two level change would pick up virtually all of the boil dry occurrences. However, it would result in some false detections as well since a change of only two levels could result from a temperature rise of as little as 18° F. The reliability of this arrangement with the three level change requirement is considered satisfactory, particularly when backed up by the maximum temperature boil dry routine.

It will be appreciated that the reliability of the delta boil dry routine could be enhanced by computing the difference over a longer time period, resulting in a somewhat slower response, or by employing a temperature sensing arrangement in which a greater number of narrower temperature ranges are used. It should also be appreciated that the delta boiling arrangement will not reliably detect boiling conditions when the surface unit is operated at power level 15 since at that level, SENOUT is updated on every pass through the Sensor Filter Timing routine hereinbefore described rather than at 2 second intervals when operating at other power levels. This limitation could be avoided by updating the sensor at power level 15 just as at the other power levels.

Referring now to the flow diagram of FIG. 13, Inquiry 320 performs the rate comparison function by comparing the difference between the variable SENOUT and SENLST with the value 2. A difference greater than 2 signifies a change in temperature of at least three temperature ranges between the most recent utensil temperature input SENOUT and the oldest of the stored measurement SENLST, which corresponds to a temperature increase on the order of 40°–50° F. It will be recalled from the description of the Filter and Timing Routine (FIG. 8) that eight successive temperature inputs are stored, with the time interval between the first and the last being approximately 16 seconds. The change of at least 40° F. in 16 seconds corresponds to a rate of increase on the order of at least 2.5°/sec. Reliability of detection could be enhanced by employing a temp sensing scheme employing more closely spaced levels. If the difference is not greater than 2, the program proceeds to Inquiry 322. If the difference is greater than 2 signifying a "boil dry" condition, the BSP latch is set (Block 324) and the program proceeds to Inquiry 322.

Inquiry 322 monitors the state of the BSP latch. If reset, no warning signal is to be generated and the annunciator control output port R8 is reset (Block 326) and the program branches (Block 328) to the Power Compare routine (FIG. 14A).

If BSP is set M(KB) is set to set to zero (Block 329) to implement the OFF or zero power setting and the balance of the routine causes annunciator 101 to be ON and OFF at alternate intervals of 1 second duration. An ON flag and two counters designated ONCNTR and OFFCNTR are used in providing the alternate ON and OFF cycles. When the ON flag is set, annunciator 101 is to be triggered ON, and when it is reset, annunciator 101 is to be OFF. Inquiry 330 monitors the state of the ON flag. When set, Inquiry 332 controls the duration of the ON cycle by determining if the ONCNTR count exceeds the count corresponding to a time duration of one second. If not, ONCNTR is incremented (Block 334) and the annunciator is triggered ON by setting output port R8 (Block 336). If the ON cycle has timed out, the ON flag and ONCNTR are reset (Block 338) causing the OFF cycle to be initiated on the next pass through this routine; if BSP remains set. The program then branches (Block 328) to the Power Compare routine (FIG. 14A). Returning to Inquiry 330, if the ON flag is reset signifying an OFF cycle in progress, Inquiry 340 determines whether the OFFCNTR signifies that the OFF cycle has timed out. If not, the OFFCNTR is incremented (Block 342), output port R8 is reset (Block 344) and the program branches (Block 328) to the Power Compare routine (FIG. 14A). If Inquiry 340 signifies the OFFCNTR has timed out, the ON flag is set and the OFFCNTR reset (Block 346) so that an ON cycle will be initiated on the next pass through this routine if BSP remains set. Output port R8 is reset (Block 344) and the program branches (Block 328) to the Power Compare routine (FIG. 14A).

While the illustrative embodiment employs annunciator 101 as the indicator means, it is to be understood that a conventional illuminating device such as an LED display could be used in addition to or as an alternative to the annunciator.

The aforementioned experimental work on water loads indicated that during the heat up phase, for such loads, i.e. before the water begins to boil, temperature increases on the order of 1°–1.25° F./second were typical for 2 and 1 cup loads respectively. Hence, false detection of boil dry conditions during the heat up phase were found not to be a problem. However, assurance against false detection during heat up such as might occur with very small utensils or water loads could be provided by modifying the Delta Boil Dry routine such that upon entering the routine the sensed utensil temperature is compared to a threshold temperature, for example 241°. If the sensed temperature exceeds 241° (SENOUT>5) indicating heat up has been completed or nearly so, the balance of the routine is executed as hereinbefore described. If the sensed temperature is not greater than 241° F., the program would skip the balance of the routine by branching to the Power Out routine (FIG. 14A).

Figure 14B:
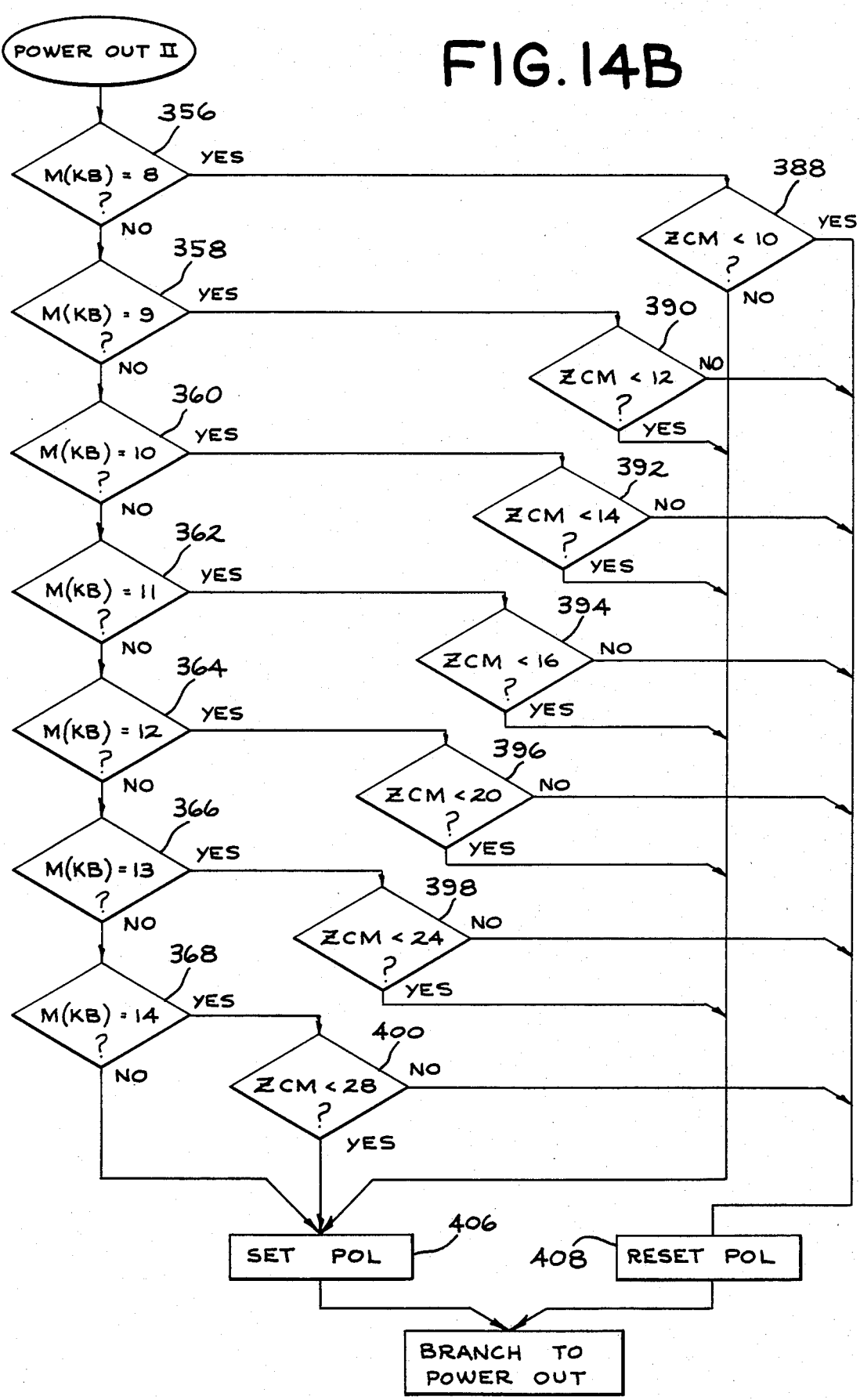

POWER COMPARE Routine—FIGS. 14A and 14B

The function of the Power Compare routine is to determine, based upon the power level designated by M(KB), whether or not the power control triac should be triggered into conduction for the next eight cycle control intervals.

It will be recalled that in the illustrative embodiment there are 16 possible power levels including OFF. The % duty cycle for each power level corresponds to the ratio of conductive control intervals to 32, the number of control intervals in the control period. The ZCM counter as hereinbefore described functions as a 32 count ring counter, which is incremented once for each pass through the control program. The power control decision is made by comparing the ZCM count with a reference count associated with the signified power level M(KB). The reference count for each power level represents the number of conductive control intervals per control period corresponding to the desired duty cycle. When the ZCM count is less than the reference, a Power Out Latch (POL) is set, signifying that switching power control triac 106 is to be switched into conduction; otherwise, POL is reset, signifying that power control triac 106 non-conductive.

Referring to FIGS. 14A and B, Inquiries 348–355 determine the value of M(KB). The appropriate one of Inquiries 372–400 corresponding to the identified M(KB) performs the comparison of ZCM to the associated reference count. If ZCM is less than the reference, the Power Out Latch is set by the appropriate one of Blocks 402 and 406, signifying that the heating element 12 is to be energized during the next control interval. Otherwise, the Power Out Latch is reset by the appropriate one of Blocks 404 and 408, signifying that heating element 12 is to be de-energized during the next control interval.

Figure 15:
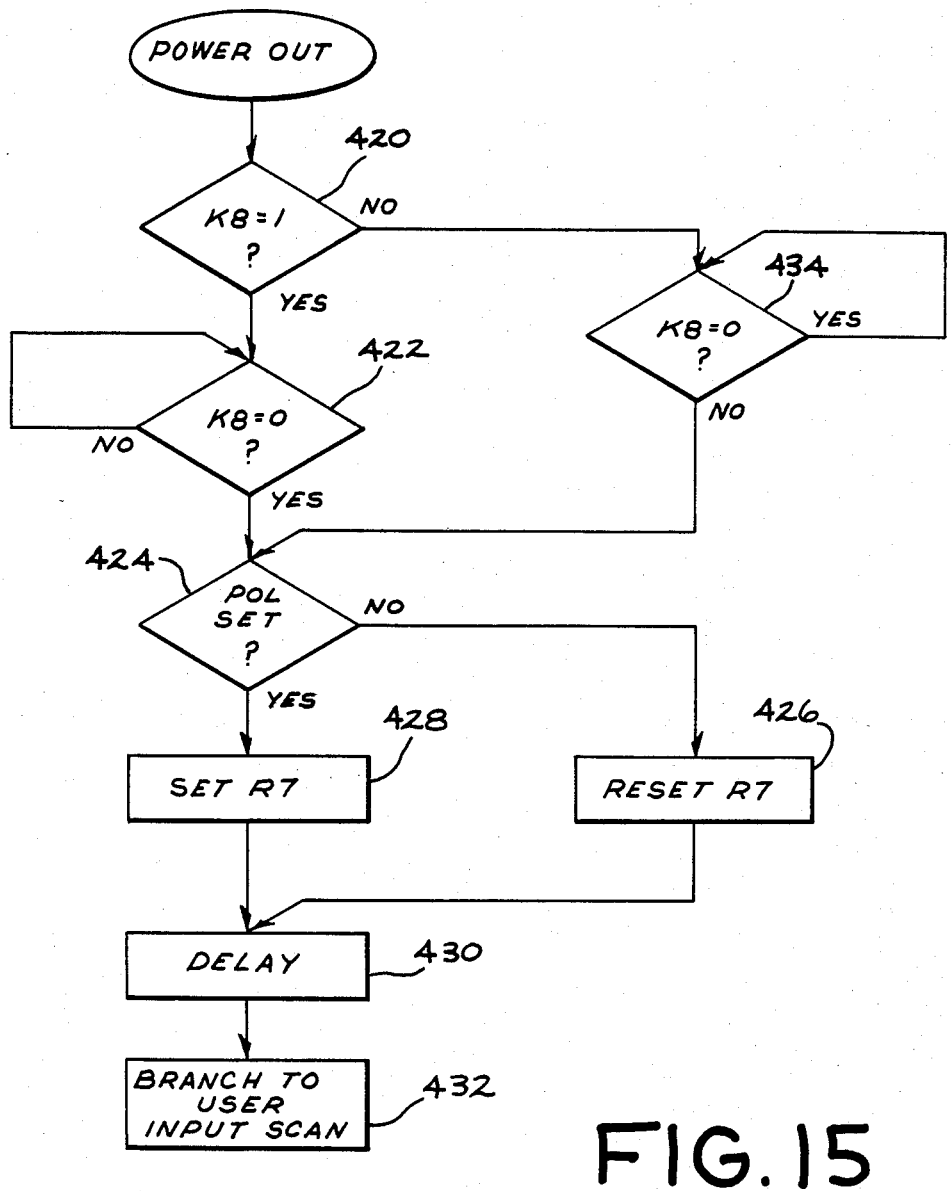
FIG. 15 is a flow diagram of the POWER OUT routine incorporated in the control program of the microprocessor in the circuit of FIG. 5.

Having made the power control decision, the program branches to the Power Out Routine, FIG. 15.

POWER OUT Routine—FIG. 15

The function of this routine is to await the next zero crossing of the 60 Hz AC power signal applied to the heating element 12 to synchronize firing of power control triac 82 (FIG. 5) with zero-crossings of the power signal.

Input port K8 receives zero crossing pulses from zero crossing detector circuit 100 (FIG. 5). Positive half-cycles are represented by K8=1 and negative half-cycles by K8=0. Inquiry 420 determines the polarity of the present power signal half-cycle. If the signal is presently in a positive half-cycle, (K8=1), Inquiry 422 waits for the beginning of the next negative half-cycle, (K8=0). Upon detection of K8=0, the program proceeds to Inquiry 424. If the answer to Inquiry 420 is NO (K8=0), Inquiry 434 waits for the beginning of the next positive half-cycle (K8=1), then proceeds to Inquiry 424. Inquiry 424 checks the state of the Power Out Latch (POL). If POL is reset, signifying that heating element 12 is not to be energized during the next control interval, R7 is reset (Block 426); if POL is set, signifying heating element 12 is to be energized, R7 is set (Block 248); the program delays (Block 430) and then returns (Block 432) to the User Input Scan Routine (FIG. 6) to repeat the control program for the next control interval.

In the illustrative embodiment the control program is executed in less than one-half cycle. Thus, it is necessary to delay the program for 15 half-cycles before repeating the User Input Scan Routine. In the hereinbefore described program this is done by simply delaying the program for 15 transitions of the input signal at K8. However, it is to be understood that microprocessor could be programmed to perform additional functions such as, for example, controlling the energization of the other three surface units during the time period between executions of the control program for heating unit 12. The other surface units could be similarly equipped with a temperature sensor and controlled by a control program similar to that for element 12. Alternatively, the elements could be controlled in conventional open loop fashion.

In the illustrative embodiment, both the delta boil dry and the temperature boil dry means are employed to benefit from the performance advantages of each. It is to be understood, however, that each operates independently of the other and hence either could be used as the only boil dry detection arrangement.

While in accordance with the Patent Statutes, a specific embodiment of the present invention has been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A boil dry detection arrangement for a cooking appliance having at least one surface unit for supporting a cooking utensil thereon while heating the contents thereof, said arrangement comprising:
   control means for controlling the energization of the surface unit by an external power supply;
   temperature sensing means for sensing the temperature of the utensil supported on the surface unit;
   indicator means responsive to said control means for generating a user discernible signal indicative of a boil dry condition;
   said control means including means responsive to said temperature sensing means for determining the rate of change of the sensed utensil temperature and detecting a rate of change greater than a predetermined reference rate, said reference rate characterizing a boil dry condition;

said control aeans being operative upon detection of a rate of increase greater than said reference rate to de-energize the surface unit and to trigger said indicator means to generate said user discernible signal.

2. The boil dry detection arrangement of claim 1 wherein said means for determining the rate of increase of sensed utensil temperature and detecting a rate in excess of a predetermined rate comprises means for periodically receiving temperature signals from said sensing means, means for sequentially storing a plurality of said temperature signals, means for determining the difference between the last received of said plurality of stored signals and the first received of said signals and means for comparing this difference with a predetermined reference difference value corresponding to said predetermined maximum rate of increase.

3. A boil dry detection arrangement for a cooking appliance having at least one surface unit constructed and arranged to support a cooking utensil thereon while heating the contents thereof, said arrangement comprising:

temperature sensing means for sensing the temperature of a utensil supported on said surface unit;

user operable input selection means enabling a user to select one of a plurality of boiling modes, each mode having associated with it a corresponding predetermined maximum boil reference temperature;

electronic control means for controlling energization of said heating element;

indicator means responsive to said control means operative to generate a user discernible signal that a boil dry condition exists;

said control means including comparing means for comparing the sensed utensil temperature from said temperature sensing means with the maximum reference temperature for the selected mode, said control means being operative to de-energize said heating element when said sensed utensil temperature exceeds said maximum boil reference temperature, for the selected mode, means for detecting an input selection change from a relatively higher boiling rate mode to a relatively lower boiling rate mode, and means responsive to said detecting means for inhibiting said control means from triggering said indicator means for a period of predetermined duration immediately following detection of a change in mode selection from said relatively higher to said relatively lower boiling rate selection, thereby preventing a false boil rate signal caused by a sensed utensil temperature greater than the reference for the neWly selected boil rate but less than the reference associated with the prior boil rate mode selection.

4. The boil dry detection arrangement of claim 3 further comprising means for prematurely terminating said period of predetermined duration upon detection of a sensed utensil temperature less than the maximum reference temperature for the newly selected lower boiling rate mode selection.

5. A boil dry detection arrangement for a cooking appliance having at least one surface unit for supporting a cooking utensil thereon while heating the contents thereof, and user operable input selection means enabling the user to select from a plurality of boil modes, said boil dry detection arrangement comprising:

control means for controlling the energization of the surface unit by an external power supply;

temperature sensing means for sensing the temperature of the utensil supported on the surface unit;

indicator means responsive to said control means for generating a user discernible signal indicative of a boil dry condition for the utensil;

said control means including first boil dry detection aeans comprising means responsive to temperature sensing means operative to determine the rate of change of the sensed utensil temperature and detect a rate of increase greater than a predetermined maximum rate, detection of which signifies the occurrence of a boil dry condition;

said control means further including second boil dry detection means responsive to said temperature sensing means for detecting a sensed utensil temperature greater than a predetermined reference temperature, the detection of which signifies the occurrence of a boil dry condition;

said control means being operative upon detection of a condition signifying the occurrence of a boil dry condition by said first detection neans or said second detection means to de-energize the surface unit and cause said indicator means to generate said user discernible signal.

6. The boil dry detection arrangement of claim 5 wherein each of the plurality of boiling modes has associated with a different predetermined maximum reference temperature and wherein said second detection means includes means for detecting a sensed utensil temperature greater than the prdetermined reference temperature associated with the selected boil mode, means for detecting a change in boil mode selection from a relatively higher mode to a relatively lower mode and means responsive to said change detecting means for inhibiting said control means from responding to the detection of a sensed utensil temperature greater than the reference temperature for a newly selected mode for a time period of predetermined duration following detection of a change from a relatively higher to a relatively lower boil mode selection.

7. The boil dry detection arrangement of claim 6 wherein said second detection means further comprises means for terminating said time period upon detection of a sensed utensil temperature less than said predetermined reference temperature for the newly selected boil mode.

8. The boil dry detection arrangement of claim 5 wherein said means for determining the rate of increase of sensed utensil temperature and detecting a rate in excess of a predetermined rate comprises means for periodically receiving temperature signals from said sensing means, means for sequentially storing a plurality of said temperature signals, means for determining the difference between the last received of said plurality of stored signals and the first received of said signals and means for comparing this difference with a predetermined reference difference value corresponding to said predetermined maximum rate of increase.

9. The boil dry detection arrangement of claim 6 wherein said means for determining the rate of increase of sensed utensil temperature and detecting a rate in excess of a predetermined rate comprises means for periodically receiving temperature signals from said sensing means, means for sequentially storing a plurality of said temperature signals, means for determining the difference between the last received of said plurality of stored signals and the first received of said signals and means for comparing this difference with a predetermined reference difference value corresponding to said predetermined maximum rate of increase.

* * * * *

UNITED STATES PATENT AND TRADEMARK OFFICE
CERTIFICATE OF CORRECTION

PATENT NO. : 4,493,981

DATED : January 15, 1985

INVENTOR(S) : Thomas R. Payne

It is certified that error appears in the above-identified patent and that said Letters Patent is hereby corrected as shown below:

Column 27, line 3, "aeans" should read --means--

Column 27, line 53, "neWly" should read --newly--

Column 28, line 7, "aeans" should read --means--

Signed and Sealed this

Twenty-eighth Day of May 1985

[SEAL]

Attest:

DONALD J. QUIGG

Attesting Officer Acting Commissioner of Patents and Trademarks